(12) United States Patent
Tatara et al.

(10) Patent No.: US 10,965,878 B2
(45) Date of Patent: Mar. 30, 2021

(54) VEHICLE ILLUMINATION SYSTEM AND VEHICLE

(71) Applicant: KOITO MANUFACTURING CO., LTD., Tokyo (JP)

(72) Inventors: Naoki Tatara, Shizuoka (JP); Toshihiro Okamura, Shizuoka (JP); Takeshi Masuda, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 16/469,881

(22) PCT Filed: Dec. 6, 2017

(86) PCT No.: PCT/JP2017/043829
§ 371 (c)(1),
(2) Date: Jun. 14, 2019

(87) PCT Pub. No.: WO2018/110389
PCT Pub. Date: Jun. 21, 2018

(65) Prior Publication Data
US 2019/0320106 A1    Oct. 17, 2019

(30) Foreign Application Priority Data

Dec. 15, 2016  (JP) .............................. JP2016-243273
Dec. 15, 2016  (JP) .............................. JP2016-243274

(51) Int. Cl.
*H04N 5/235* (2006.01)
*B60Q 1/08* (2006.01)
(Continued)

(52) U.S. Cl.
CPC ............. *H04N 5/2352* (2013.01); *B60Q 1/08* (2013.01); *B60R 11/04* (2013.01); *H04N 5/247* (2013.01);
(Continued)

(58) Field of Classification Search
CPC ........ H04N 5/2352; H04N 5/247; H04N 7/18; B60R 11/04; B60Q 1/08;
(Continued)

(56) References Cited

U.S. PATENT DOCUMENTS 6,456,206 B1 *  9/2002  Rocca .................. B60Q 1/2603
                                                                      307/10.8
2004/0105027 A1   6/2004  Kawamura et al.
(Continued)

FOREIGN PATENT DOCUMENTS

JP    H09-277887 A    10/1997
JP    2003-87645 A     3/2003
(Continued)

OTHER PUBLICATIONS

International Search Report issued in Application No. PCT/JP2017/043829, dated Mar. 6, 2018 (3 pages).
(Continued)

*Primary Examiner* — Tat C Chio
(74) *Attorney, Agent, or Firm* — Osha Bergman Watanabe & Burton LLP

(57) ABSTRACT

A vehicle illumination system includes a light source unit capable of irradiating a front of a vehicle with light, a camera, an imaging control unit, and an image generation unit which performs computation for an image acquired by the camera, the imaging control unit enables the camera to capture the front of the vehicle and to output a first image to the image generation unit when the light source unit irradiates the front of the vehicle in the first mode, and enables the camera to capture the front of the vehicle and to output a second image to the image generation unit when the light source unit irradiates the front of the vehicle in a second mode in which light is irradiated with an illuminance higher than in the first mode, and the image generation unit
(Continued)

generates a single output image by the first image and the second image.

10 Claims, 9 Drawing Sheets

(51) Int. Cl.
  *B60R 11/04* (2006.01)
  *H04N 5/247* (2006.01)
  *G05D 1/02* (2020.01)
(52) U.S. Cl.
  CPC .......... *G05D 1/0231* (2013.01); *G05D 1/0257* (2013.01); *G05D 1/0278* (2013.01); *G05D 2201/0213* (2013.01)
(58) Field of Classification Search
  CPC .......... G05D 2201/0213; G05D 1/0278; G05D 1/0257; G05D 1/0231; G08G 1/16
  See application file for complete search history.

(56) References Cited

U.S. PATENT DOCUMENTS

| 2013/0182111 A1* | 7/2013 | Ogasawara | H04N 7/18 348/148 |
| 2013/0229513 A1* | 9/2013 | Ichitani | G02B 27/1066 348/135 |

FOREIGN PATENT DOCUMENTS

| JP | 2007235656 A | 9/2007 |
| JP | 2013-147112 A | 8/2013 |
| JP | 2016-189557 A | 11/2016 |

OTHER PUBLICATIONS

Written Opinion issued in International Application No. PCT/JP2017/043829, dated Mar. 6, 2018 (5 pages).
Partial Supplementary European Search Report issued in corresponding European Application No. 17879867.4, dated Jun. 4, 2020 (16 pages).

* cited by examiner

VEHICLE ILLUMINATION SYSTEM AND VEHICLE

TECHNICAL FIELD

The present invention relates to a vehicle illumination system and a vehicle.

BACKGROUND ART

Currently, research on an automatic driving technology of an automobile has been actively conducted in each country, and each country is considering the legislation so as to enable a vehicle to travel in an automatic driving mode on public roads. Here, the automatic driving mode indicates a mode in which traveling of a vehicle is automatically controlled. On the other hand, a manual driving mode indicates a mode in which traveling of a vehicle is controlled by a driver. In the automatic driving vehicle, traveling of a vehicle is automatically controlled by a computer.

Thus, in the future, it is expected that vehicles traveling in the automatic driving mode (hereinafter, referred to as "automatic driving vehicle") and vehicles traveling in the manual driving mode (hereinafter, referred to as "manual driving vehicle") coexist on public roads.

PTL 1 discloses an automatic follow-up traveling system in which a following vehicle automatically follows a preceding vehicle. In the automatic follow-up traveling system, each of the preceding vehicle and the following vehicle has a display system, character information for preventing the other vehicle from intruding between the preceding vehicle and the following vehicle is displayed on the display device of the preceding vehicle, and character information indicative of the automatic follow-up traveling mode is displayed on the display device of the following vehicle.

CITATION LIST

Patent Literature

PTL 1: JP-A-H09-277887

SUMMARY OF INVENTION

Technical Problem

The automatic driving vehicle is configured to acquire front information by a camera and to control the vehicle, in correspondence to the acquired information. When high-intensity light such as light emitted from a headlight of an oncoming vehicle is incident on the camera, halation occurs in the camera, so that it is difficult to efficiently acquire information about the front of the vehicle.

It is therefore an object of the present invention to provide a vehicle illumination system and a vehicle capable of favorably acquiring information about the front of the vehicle, irrespective of a light quantity of incident light.

Solution to Problem (1) A vehicle illumination system of the present invention includes:

a light source unit capable of irradiating a front of a vehicle with light in at least two irradiation modes including a first irradiation mode and a second irradiation mode in which light is to be irradiated with an illuminance higher than in the first irradiation mode, a camera capable of capturing the front of the vehicle, an imaging control unit configured to set an irradiation mode of the light source unit and a capturing timing of the camera, and an image generation unit configured to perform computation for an image acquired by the camera, wherein the imaging control unit:

enables the camera to capture the front of the vehicle and to output a first image to the image generation unit when the light source unit irradiates the front of the vehicle in the first irradiation mode, and enables the camera to capture the front of the vehicle and to output a second image to the image generation unit when the light source unit irradiates the front of the vehicle in the second irradiation mode, and wherein the image generation unit is configured to generate a single output image by the first image and the second image.

According to the vehicle illumination system configured as described above, the output image is generated by the first image and the second image. The first image and the second image have such a relation that a demerit of one side is complemented by a merit of the other side. Therefore, the output image is generated from both the images, so that a dark target in the first image, which is difficult to be recognized due to an insufficient amount of light, can be easily recognized by the second image. A bright target in the second image, which is difficult to be recognized due to a halation, can be easily recognized by the first image. In this way, according to the vehicle illumination system of the present invention, it is possible to favorably acquire the information about the front of the vehicle, irrespective of an amount alight of incident light.

(2) In the vehicle illumination system of the present invention, the image generation unit may be configured to obtain the output image by replacing a part of the first image, which has a luminance equal to or smaller than a first threshold value, with a part of the second image corresponding to the part, and/or replacing a part of the second image, which has a luminance equal to or greater than a second threshold value larger than the first threshold value, with a part of the first image corresponding to the part.

According to the vehicle illumination system configured as described above, the dark target in the first image, which is difficult to be recognized due to the insufficient amount of light, can be easily recognized by the part replaced with the second image. The bright target in the second image, which is difficult to be recognized due to the halation, can be easily recognized by the part replaced with the first image. Therefore, it is possible to favorably complement the images by replacing the part of the first image, which is difficult to be recognized, with the part of the second image and the part of the second image, which is difficult to be recognized, with the part of the first image.

(3) in the vehicle illumination system of the present invention, the imaging control unit may be configured to control the light source unit so as to alternately switch the first irradiation mode and the second irradiation mode.

According to the vehicle illumination system configured as described above, the irradiation mode is alternately switched between the first irradiation mode and the second irradiation mode by the light source unit, so that it is possible to securely acquire the first image and the second image and to perform the image complement processing.

(4) In the vehicle illumination system of the present invention, the light source unit may be configured to irradiate the front of the vehicle with the light in the first irradiation mode in normal times, and the imaging control unit may be configured to control the light source unit so as to change the irradiation mode to the second irradiation mode with a predetermined interval.

According to the vehicle illumination system configured as described above, since the light source unit irradiates the light in the first irradiation mode, in which illuminance is low, in normal times, it is difficult to irradiate the glare toward an oncoming vehicle and the like.

(5) In the vehicle illumination system of the present invention, the predetermined interval may be 20 msec or shorter.

According to the vehicle illumination system configured as described above, the flicker is not irradiated to a driver even though the first irradiation mode and the second irradiation mode are switched.

(6) A vehicle illumination system of the present invention includes:

a light source unit capable of irradiating a front of a vehicle with light, a camera unit capable of capturing the front of the vehicle in at least two imaging modes including a first imaging mode and a second imaging mode in which sensitivity is higher than and/or an exposure time is longer than in the first imaging mode, an imaging control unit configured to set the imaging mode and a capturing timing of the camera unit, and an image generation unit configured to perform computation for an image acquired by the camera, wherein the imaging control unit is configured:

to enable the camera unit to capture the front of the vehicle and to output a first image to the image generation unit in the first imaging mode, and to enable the camera unit to capture the front of the vehicle and to output a second image to the image generation unit in the second imaging mode, and wherein the image generation unit is configured to generate a single output image by the first image and the second image.

According to the vehicle illumination system configured as described above, the camera unit can capture the front of the vehicle in the first imaging mode and the second imaging mode in which the sensitivity is higher than and/or the exposure time is longer than in the first imaging mode. The output image is generated by the first image captured in the first imaging mode and the second image captured in the second imaging mode. The first image captured in the first imaging mode and the second image captured in the second capturing mode in which the sensitivity is higher than and/or the exposure time is longer than in the first imaging mode have such a relation that a demerit of one side is complemented by a merit of the other side.

Therefore, the output image is generated from both the images, so that a dark target in the first image, which is difficult to be recognized due to blackout resulting from an insufficient amount of light, can be easily recognized by the second image. A bright target in the second image, which is difficult to be recognized due to a halation resulting from an excessive amount of light, can be easily recognized by the first image. In this way, since the output image, in which the first image and the second image have been complemented with each other by replacing easily-recognizable parts thereof, is acquired, it is possible to favorably acquire the information about the front of the vehicle, irrespective of the amount of light of the incident light.

(7) The image generation unit may be configured to obtain the output image by replacing a part of the first image, which has a luminance equal to or smaller than a first threshold value, with a part of the second image corresponding to the part, and/or replacing a part of the second image, which has a luminance equal to or greater than a second threshold value larger than the first threshold value, with a part of the first image corresponding to the part.

According to the vehicle illumination system configured as described above, the dark target in the first image, which is difficult to be recognized due to the insufficient amount of light, can be easily recognized by the part replaced with the second image. The bright target in the second image, which is difficult to be recognized due to the halation resulting from the excessive amount of light, can be easily recognized by the part replaced with the first image. Therefore, it is possible to favorably complement the images by replacing the part of the first image, which is difficult to be recognized, with the part of the second image or replacing the part of the second image, which is difficult to be recognized, with the part of the first image, and to securely acquire information about a place at which the halation has occurred due to the excessive amount of light and a place at which the blackout has occurred due to the insufficient amount of light.

(8) The camera unit includes:

a first camera configured to take an image of the front of the vehicle in the first imaging mode, and a second camera configured to take an image of the front of the vehicle in the second imaging mode, and the imaging control unit may be configured to enable the first camera and the second camera to take an image at the same time.

According to the vehicle illumination system configured as described above, since it is possible to acquire the first image and the second image with no time lag, there is no positional deviation of the target between the first image and the second image, so that it is possible to easily associate a positional relation between the first image and the second image.

(9) The imaging control unit may be configured to enable the camera unit to take an image with alternately switching the first imaging mode and the second imaging mode.

According to the vehicle illumination system configured as described above, the imaging mode is alternately switched between the first imaging mode and the second imaging mode by the camera unit, so that it is possible to securely acquire the first image and the second image and to perform the image complement processing. Furthermore, since it is possible to configure the camera unit by a single camera, it is possible to simplify the system.

(10) The imaging control unit may be configured to enable the camera unit to take an image in the first imaging mode after taking an image in the second imaging mode in which the exposure time is shorter.

According to the vehicle illumination system configured as described above, since it is possible to acquire the first image and the second image with a short time lag, it is possible to suppress a positional deviation of the target between the first image and the second image.

(11) A vehicle of the present invention includes the vehicle illumination system according to one of the items (1) to (10).

According to the vehicle configured as described above, it is possible to acquire surrounding information about a pedestrian, an oncoming vehicle, a front traveling vehicle, a mark, a road surface and the like from the obtained output image, and to favorably perform automatic driving control, for example, based on the surrounding information.

Advantageous Effects of Invention

According to the present invention, it is possible to provide the vehicle illumination system and the vehicle capable of favorably acquiring the information about the front of the vehicle, irrespective of the amount of light of incident light.

DESCRIPTION OF EMBODIMENTS

Figure 1A:
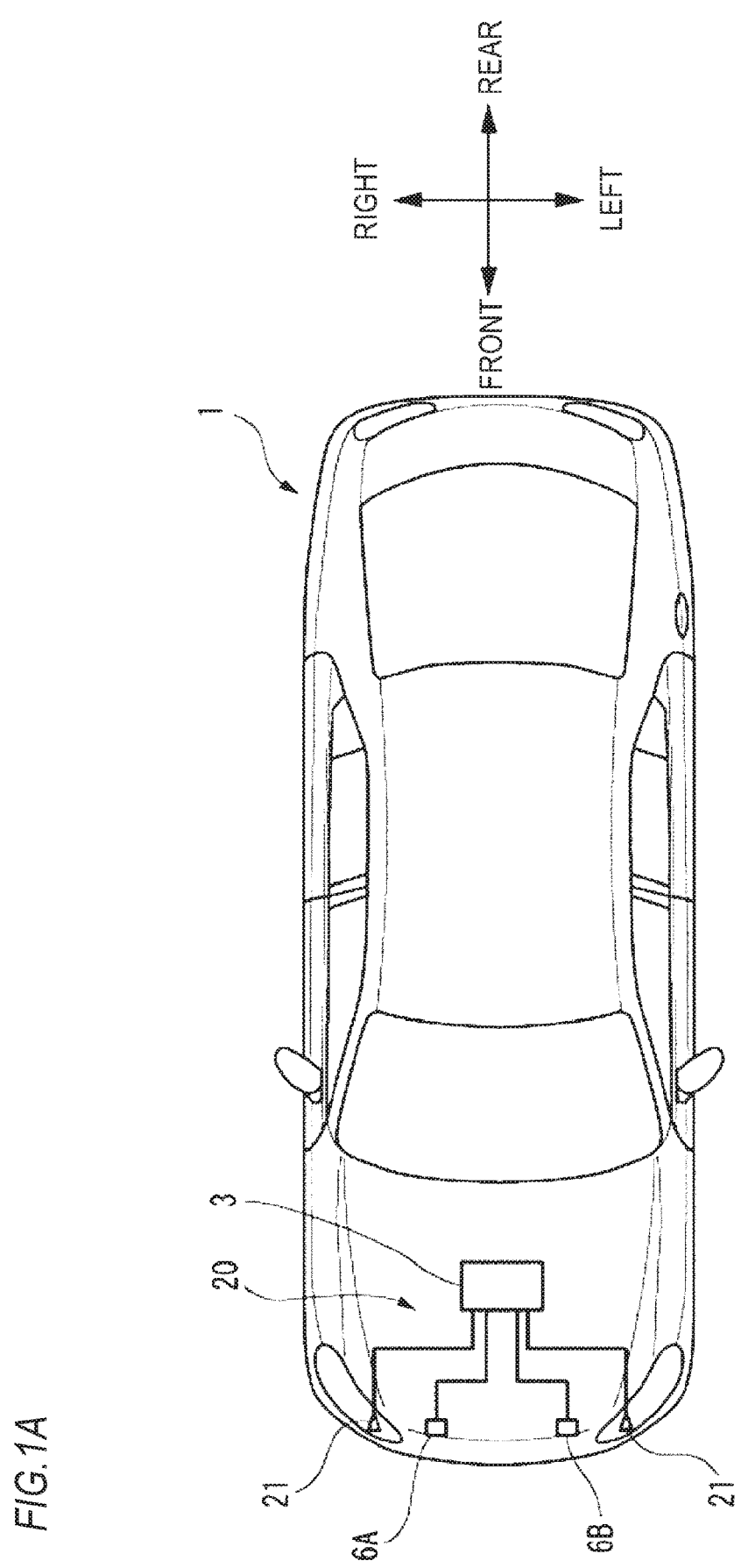
FIG. 1A is a plan view of a vehicle in accordance with a first exemplary embodiment of the present invention.

Hereinafter, an exemplary embodiment of the present invention (hereinafter, referred to as the exemplary embodiment) will be described with reference to the drawings. Meanwhile, for the sake of convenience of descriptions, the description of members having the same reference numerals as those already described in the description of the exemplary embodiment will be omitted. Also, for the sake of convenience of description, dimensions of the respective members shown in the drawings may be different from actual dimensions of the respective members.

Also, in the description of the exemplary embodiment, for the sake of convenience of description, "the right and left direction", "the front and rear direction" and "the upper and lower direction" will be appropriately mentioned. The directions are relative directions set with respect to a vehicle 1 shown in FIGS. 1A and 1B. Here, "the upper and lower direction" is a direction including "the upward direction" and "the downward direction". "The front and rear direction" is a direction including "the forward direction" and "the rearward direction". "The right and left direction" is a direction including "the rightward direction" and "the leftward direction".

First Exemplary Embodiment

Figure 1B:
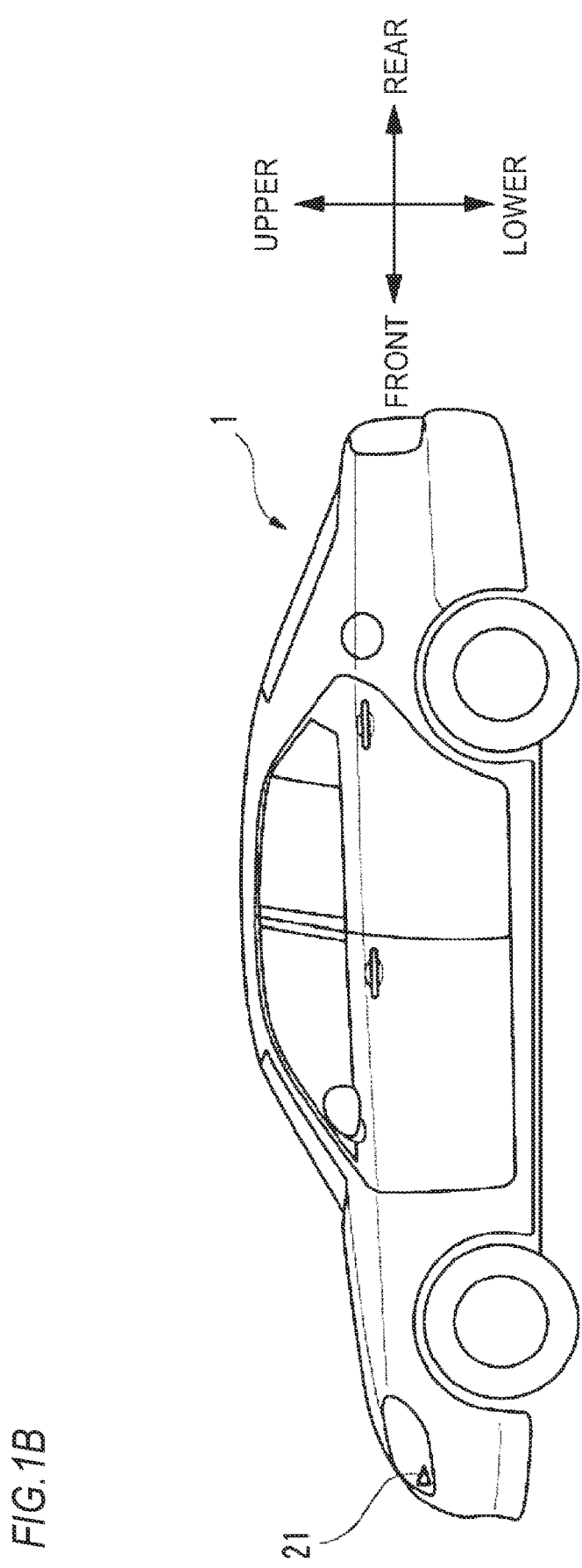
FIG. 1B is a side view of the vehicle shown in FIG. 1A.

FIGS. 1A and 1B depict a vehicle 1 on which a vehicle illumination system 20 in accordance with a first exemplary embodiment is mounted. FIG. 1A is a plan view of the vehicle 1, and FIG. 1B is a side view of the vehicle 1, The vehicle 1 is an automobile that can travel in an automatic driving mode, and includes the vehicle illumination system 20.

Figure 2:
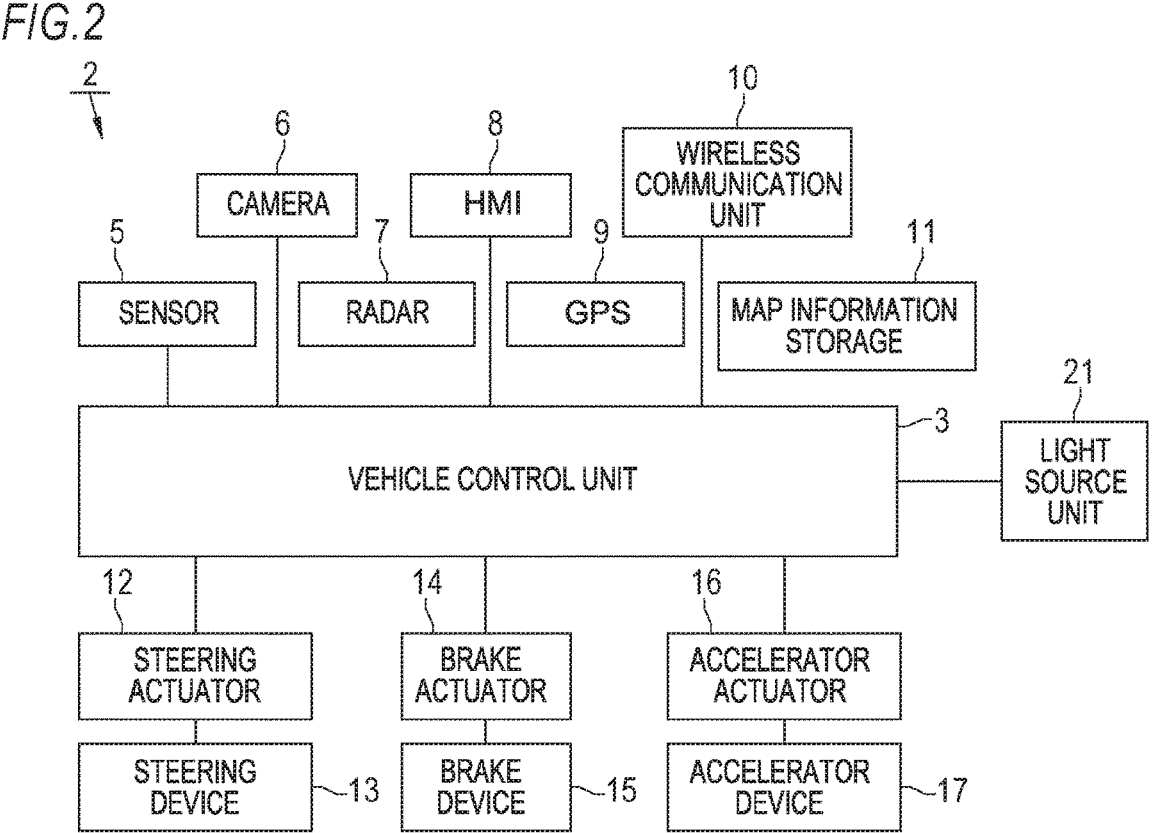
FIG. 2 is a block diagram of a vehicle system.

First, a vehicle system 2 of the vehicle 1 is described with reference to FIG. 2. FIG. 2 is a block diagram of the vehicle system 2. As shown in FIG. 2, the vehicle system 2 includes a vehicle control unit 3, a sensor 5, a camera 6, a radar 7, an HMI (Human Machine Interface) 8, a GPS (Global Positioning System) 9, a wireless communication unit 10, and a map information storage 11. Further, the vehicle system 2 includes a steering actuator 12, a steering device 13, a brake actuator 14, a brake device 15, an accelerator actuator 16, and an accelerator device 17.

The vehicle control unit 3 is configured by an electronic control unit (ECU). The electronic control unit is configured by a processor such as a CPU (Central Processing Unit), a ROM (Read Only Memory) in which a variety of vehicle control programs are stored, and a RAM (Random Access Memory) in which a variety of vehicle control data is temporarily stored. The processor is configured to develop a program, which is designated from the diverse vehicle control programs stored in the ROM, on the RAM, and to execute a variety of processing in cooperation with the RAM. The vehicle control unit 3 is configured to control traveling of the vehicle 1.

The sensor 5 includes an acceleration sensor, a speed sensor, a gyro sensor, and the like. The sensor 5 is configured to detect a traveling condition of the vehicle 1 and to output traveling condition information to the vehicle control unit 3. The sensor 5 may further include a seating sensor configured to detect whether a driver is sitting on a driver seat, a face direction sensor configured to detect a direction of a driver's face, an external weather sensor configured to detect an external weather condition, a passenger detection sensor configured to detect whether there is a passenger in a vehicle, and the like. Further, the sensor 5 may include an illuminance sensor configured to detect an illuminance of a surrounding environment around the vehicle 1.

The camera 6 is, for example, a camera including an imaging element such as a CCD (Charge-Coupled Device) and a CMOS (complementary MOS). The camera 6 is a camera configured to detect visible light or an infrared sensor configured to detect infrared rays. The radar 7 is a millimeter wave radar, a microwave radar or a laser radar. The camera 6 and the radar 7 are configured to detect a surrounding environment (other vehicle, a pedestrian, a road shape, a traffic sign, an obstacle and the like) around the vehicle 1, and to output information about the surrounding environment to the vehicle control unit 3.

The HMI 8 includes an input unit configured to receive an input operation from a driver and an output unit configured to output traveling information and the like toward the driver. The input unit includes a steering wheel, an accelerator pedal, a brake pedal, a driving mode changeover switch for switching a driving mode of the vehicle 1, and the like. The output unit is a display for displaying a variety of traveling information.

The GPS 9 is configured to acquire current position information of the vehicle 1 and to output the acquired current position information to the vehicle control unit 3. The wireless communication unit 10 is configured to receive traveling information of other vehicles around the vehicle 1 from the other vehicles and to transmit traveling information of the vehicle 1 to the other vehicles (inter-vehicle communication). Also, the wireless communication unit 10 is configured to receive infrastructure information from an infrastructure equipment such as a traffic light, a marker lamp and the like and to transmit the traveling information of the vehicle 1 to the infrastructure equipment (road-to-vehicle communication). The map information storage 11 is an external storage device such as a hard disk drive in which map information is stored, and is configured to output the map information to the vehicle control unit 3.

When the vehicle 1 travels in an automatic driving mode, the vehicle control unit 3 automatically generates at least one of a steering control signal, an accelerator control signal and a brake control signal, based on the traveling condition information, the surrounding environment information, the current position information, the map information and the like. The steering actuator 12 is configured to receive the steering control signal from the vehicle control unit 3 and to control the steering device 13 on the basis of the received steering control signal. The brake actuator 14 is configured to receive the brake control signal from the vehicle control unit 3 and to control the brake device 15 on the basis of the received brake control signal. The accelerator actuator 16 is configured to receive the accelerator control signal from the vehicle control unit 3 and to control the accelerator device 17 on the basis of the received accelerator control signal. In this way, in the automatic driving mode, the traveling of the vehicle 1 is automatically controlled by the vehicle system 2.

On the other hand, when the vehicle 1 travels in a manual driving mode, the vehicle control unit 3 generates a steering control signal, an accelerator control signal and a brake control signal in conformity with a driver's manual operation on the accelerator pedal, the brake pedal and the steering wheel. In this way, in the manual driving mode, the steering control signal, the accelerator control signal and the brake control signal are generated by the driver's manual operation, so that the traveling of the vehicle 1 is controlled by the driver.

Subsequently, the driving mode of the vehicle 1 is described. The driving mode includes an automatic driving mode and a manual driving mode. The automatic driving mode includes a full-automatic driving mode, an advanced driving support mode, and a driving support mode. In the full-automatic driving mode, the vehicle system 2 is configured to automatically perform all of the traveling controls of the steering control, the brake control and the accelerator control, and the driver is not in a state where it is possible to drive the vehicle 1. In the advanced driving support mode, the vehicle system 2 is configured to automatically perform all of the traveling controls of the steering control, the brake control and the accelerator control, and the driver does not drive the vehicle 1 although the driver is in a state where it is possible to drive the vehicle 1. In the driving support mode, the vehicle system 2 is configured to automatically perform a part of the traveling controls of the steeling control, the brake control and the accelerator control, and the driver drives the vehicle 1 under the driving support of the vehicle system 2. On the other hand, in the manual driving mode, the vehicle system 2 is configured not to automatically perform the traveling controls, and the driver drives the vehicle 1 without the driving support of the vehicle system 2.

Also, the driving mode of the vehicle 1 may be switched by operating a driving mode changeover switch. In this case, the vehicle control unit 3 is configured to switch the driving mode of the vehicle 1 among the four driving modes (the full-automatic driving mode, the advanced driving support mode, the driving support mode, and the manual driving mode) in correspondence to a driver's operation on the driving mode changeover switch. Also, the driving mode of the vehicle 1 may be automatically switched on the basis of information relating to a travel-allowed section where traveling of an automatic driving vehicle is allowed or a travel-prohibited section where the traveling of the automatic driving vehicle is prohibited or information relating to the external weather condition. In this case, the vehicle control unit 3 is configured to switch the driving mode of the vehicle 1, based on such information. Also, the driving mode of the vehicle 1 may be automatically switched by using a seating sensor, a face direction sensor, or the like. In this case, the vehicle control unit 3 is configured to switch the driving mode of the vehicle 1, based on an output signal from the seating sensor or the face direction sensor.

Subsequently, the vehicle illumination system 20 is described in detail. As shown in FIGS. 1A and 1B, the vehicle illumination system 20 includes light source units 21, and the camera 6. The light source units 21 are provided at left and right sides of a front part of the vehicle 1, and are configured to irradiate a front of the vehicle 1. The camera 6 is provided in the vicinity of a center of the front part of the vehicle 1 in a width direction. The light source units 21 and the camera 6 are respectively connected to the vehicle control unit 3. In the meantime, the light source unit 21 and the camera 6 may be separately provided or the camera 6 may be provided integrally with the light source unit 21.

Figure 3:
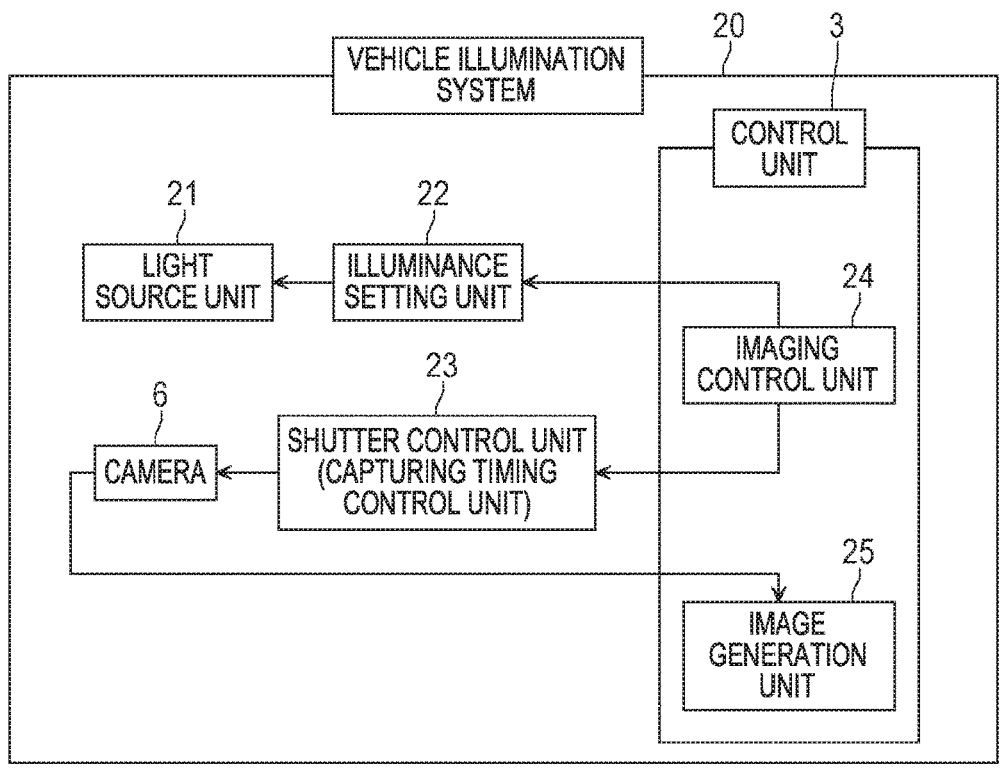
FIG. 3 is a block diagram of a vehicle illumination system in accordance with the exemplary embodiment of the present invention.

FIG. 3 is a block diagram of the vehicle illumination system 20. As shown in FIG. 3, the vehicle illumination system 20 includes an imaging control unit 24, and an image generation unit 25. The imaging control unit 24 and the image generation unit 25 are provided in the vehicle control unit 3.

The light source unit 21 is connected to an illuminance setting unit 22, and the illuminance setting unit 22 is connected to the imaging control unit 24 of the vehicle control unit 3. The light source unit 21 is configured to irradiate the front of the vehicle with light in at least two irradiation modes including a first irradiation mode and a second irradiation mode in which light is to be irradiated with an illuminance higher than in the first irradiation mode. In the exemplary embodiment, the light source unit 21 is a light source mounted on a lamp configured to irradiate light over an entire capturing range of the camera 6 in front of the vehicle. The light source unit 21 is mounted in a headlight for a vehicle capable of forming a high beam light distribution pattern and a low beam light distribution pattern.

The illuminance setting unit 22 is configured to perform illuminance control of the light source unit 21, based on a command from the imaging control unit 24. The light source unit 21 is switched between the first irradiation mode and the second irradiation mode by the illuminance control of the illuminance setting unit 22. The illuminance setting unit 22 and the light source unit 21 are components configuring a lamp unit of the vehicle 1.

The camera 6 is connected to a shutter control unit 23. The shutter control unit 23 is connected to the imaging control unit 24 of the vehicle control unit 3. The camera 6 is configured to take an image of the front of the vehicle 1 and to acquire information about the front of the vehicle 1. The shutter control unit 23 is configured to control a capturing timing of the camera 6, based on a command from the imaging control unit 24. The camera 6 is connected to the image generation unit 25 of the vehicle control unit 3, and is configured to transmit data of the captured image to the image generation unit 25. The image generation unit 25 is configured to acquire the data of the image from the camera 6 and to perform computation for the acquired image.

In order to detect the surrounding environment around the vehicle 1 during the automatic driving, the camera 6 is configured to take an image of the front of the vehicle 1, and to acquire information about a pedestrian, an oncoming vehicle, a front traveling vehicle, a mark, a road surface and the like. The vehicle control unit 3 is configured to perform automatic driving control of the vehicle 1, based on the surrounding environment around the vehicle 1 acquired from the image transmitted from the camera 6.

In the meantime, as compared to human eyes, a camera is difficult to recognize a bright target and a dark target at the same time. For example, when capturing a dark target, a sensitivity of a camera is set high or an exposure time thereof is set long. Thereby, it is possible to secure an amount of light to be received from the target, thereby acquiring a clear image with no blackout. To the contrary, when capturing a bright target, the sensitivity of the camera is set low or the exposure time thereof is set short. Thereby, it is possible to adjust an amount of light to be received from the target, thereby acquiring a clear image with no halation. In the meantime, the sensitivity of the camera is set by adjusting an aperture value or ISO sensitivity of the camera.

As regards the targets such as a pedestrian, an oncoming vehicle, a front traveling vehicle, a mark, a road surface and the like, which are to be acquired as the information by the camera mounted on an automatically drivable vehicle, reflected light from a mark, light to be emitted from a headlight of an oncoming vehicle, light to be emitted from a marker lamp of a front traveling vehicle, and reflected light from a road surface in the vicinity of a host vehicle have high intensities. For this reason, when the sensitivity and exposure time of the camera are set so as to conform with the intensities of the lights, the halation that an image is blurred in white due to the intense light does not occur, so that it is possible to clearly recognize the target. On the other hand, since the reflected light from a pedestrian is weak, the camera is difficult to efficiently recognize the pedestrian.

When the sensitivity of the camera is set high or the exposure time is set long so as to efficiently recognize a pedestrian, it is possible to acquire a clear image with no blackout. However, the halation is caused due to the reflected light from a mark, the light to be emitted from a headlight of an oncoming vehicle, the light to be emitted from a marker lamp of a front traveling vehicle, the reflected light from a road surface in the vicinity of a host vehicle, and the like, so that it is difficult to efficiently recognize the corresponding targets.

Figure 4A:
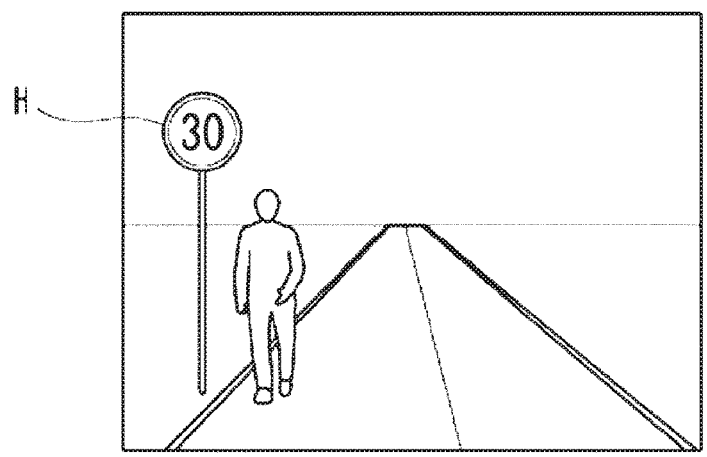
FIG. 4A is a pictorial view showing an actual image of a front of the vehicle.
Figure 4B:
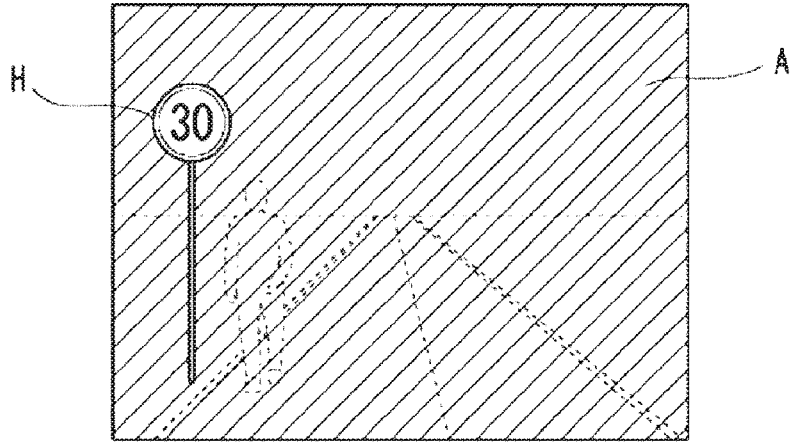
FIG. 4B is a pictorial view showing an image of the front of the vehicle, depicting an image having an insufficient amount of light.
Figure 4C:
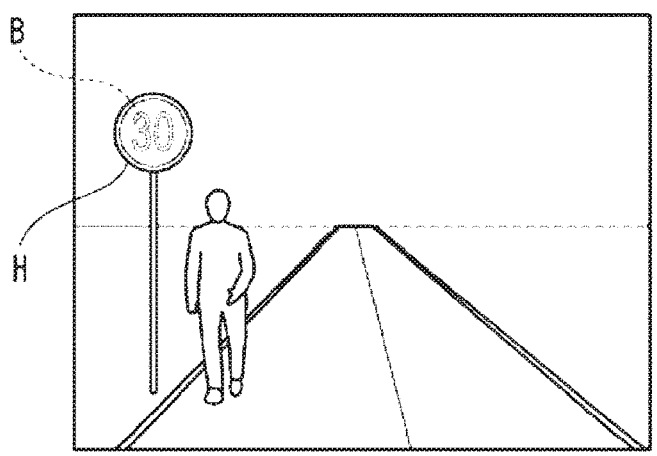
FIG. 4C is a pictorial view showing an image of the front of the vehicle, depicting an image having an excessive amount of light.

FIGS. 4A to 4C show images of the front of the vehicle 1, in which FIG. 4A is a pictorial view showing an actual image, FIG. 4B is a pictorial view showing an image of an insufficient amount of light and FIG. 4C is a pictorial view showing an image of an excessive amount of light.

In the first irradiation mode, the light source unit 21 is configured to irradiate the front of the vehicle 1 with light having an illuminance lower than in the second irradiation mode. Therefore, if an actual image of the front of the vehicle 1 is the image shown in FIG. 4A, a target having high reflectivity such as a mark H can be easily recognized without causing halation due to the excessive amount of light, in an image (first image) captured by the camera 6 in the first irradiation mode, as shown in FIG. 4B. However, a blackout (a part A hatched in FIG. 4B) in which an image is darkened due to the insufficient amount of light is likely to occur.

In the second irradiation mode, the light source unit 21 is configured to irradiate the front of the vehicle 1 with light having an illuminance higher than in the first irradiation mode. Therefore, a dark target can be easily recognized without causing blackout due to the insufficient amount of light, in an image (second image) captured by the camera 6 in the second irradiation mode. However, a halation (a part B in FIG. 4C) is likely to occur in the target such as a mark H due to the excessive amount of light.

Like this, regarding each of the images captured by the camera 6 in the states where the light source unit 21 is in the first irradiation mode and the second irradiation mode, it may be difficult to obtain a clear image. Therefore, in the first exemplary embodiment, in order to improve recognition of a target in an image captured with the camera 6 for acquiring the surrounding information around the vehicle 1, processing of generating a single output image by the first image and the second image is executed, as follows.

Figure 5:
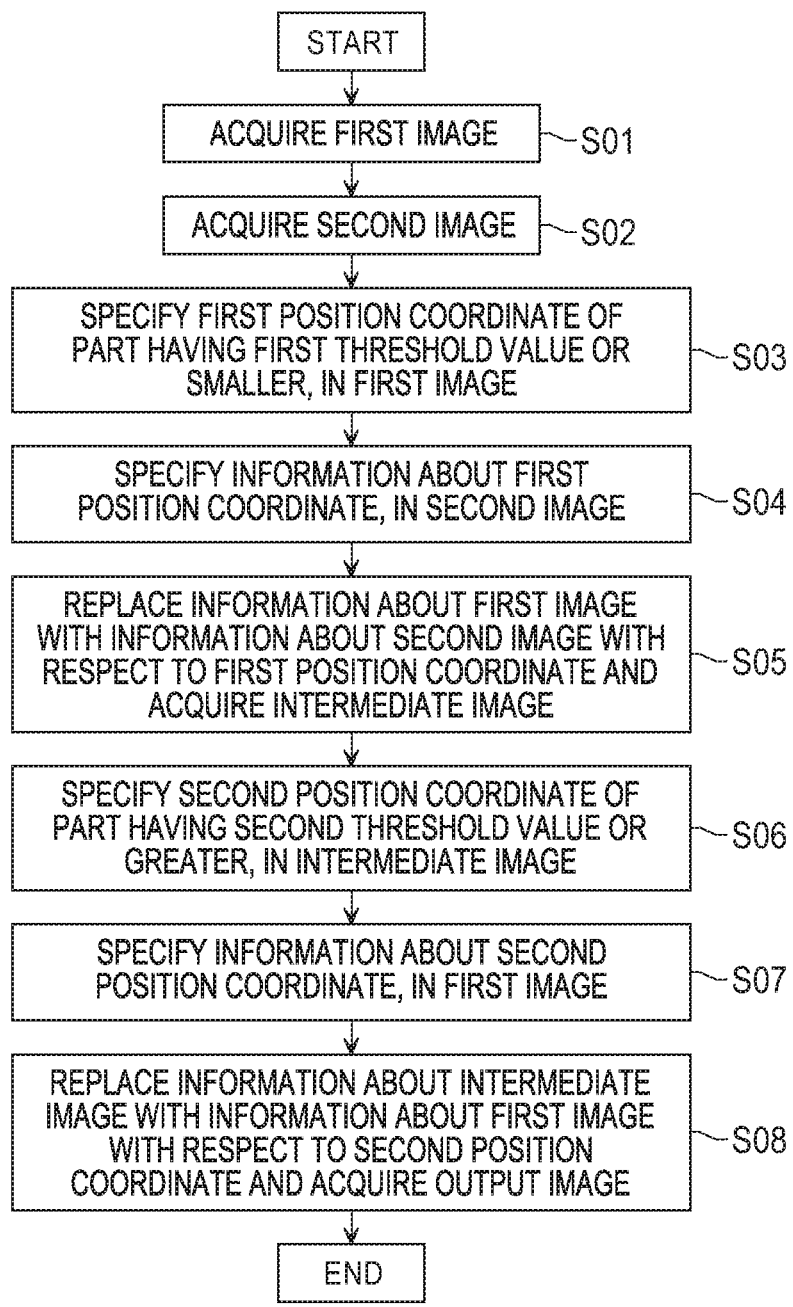
FIG. 5 is a flowchart showing image complement processing by a vehicle illumination system in accordance with the first exemplary embodiment.

FIG. 5 is a flowchart showing processing that is to be executed by the vehicle illumination system 20 in accordance with the first exemplary embodiment.

When the illuminance setting unit 22 is instructed to set the mode of the light source unit 21 to the first irradiation mode, the imaging control unit 24 issues a command to the shutter control unit 23, thereby causing the camera 6 to capture the front of the vehicle 1. Then, a first image, which is data of the image, is output to the image generation unit 25 (step S01). Thereby, the image generation unit 25 acquires the image of FIG. 4B.

Also, when the illuminance setting unit 22 is instructed to set the mode of the light source unit 21 to the second irradiation mode and the light source unit 21 is thus enabled to irradiate the front of the vehicle 1 with a high beam, the imaging control unit 24 issues a command to the shutter control unit 23, thereby enabling the camera 6 to capture the front of the vehicle 1. Then, a second image, which is data of the image, is output to the image generation unit 25 (step S02). Thereby, the image generation unit 25 acquires the image of FIG. 4C.

Here, the imaging control unit 24 issues a command to the illuminance setting unit 22 and the shutter control unit 23 so as to acquire the first image and the second image by alternately switching the light source unit 21 between the first irradiation mode and the second irradiation mode with a predetermined interval, for example. In the meantime, the imaging control unit 24 may be configured to issue a command to the illuminance setting unit 22 so as to enable the light source unit 21 to irradiate the front of the vehicle 1 with light in the first irradiation mode in normal times and to issue a command to the illuminance setting unit 22 so as to change the light source unit 21 to the second irradiation mode with a predetermined interval, for acquisition of the first image and the second image. In this case, the predetermined interval that is a timing of switching the irradiation mode of the light source unit 21 is preferably set to 20 msec or shorter.

Then, the image generation unit 25 specifies a region (a part A in FIG. 4B) of an insufficient amount alight (blackout) in the first image transmitted from the camera 6 (step S03). Specifically, the image generation unit 25 detects a part having a first threshold value or smaller, which is a preset threshold value of the luminance, in the first image and specifies a first position coordinate that is a coordinate of the part.

The image generation unit 25 specifies information about the first position coordinate in the second image, based on the second image (step S04). That is, the region of the insufficient amount of light (blackout) specified in the first image is specified in the second image.

Then, the image generation unit 25 replaces the information of the first image with the information of the second image with respect to the first position coordinate. Thereby, an intermediate image in which a part of the first image, which has a luminance equal to or smaller than the first threshold value, has been replaced with a part of the second image corresponding to the part is acquired (step S05).

In this way, the blackout region in FIG. 4B is replaced with the image of FIG. 4C, so that it is possible to acquire the intermediate image with no blackout.

A target (a mark and the like) in which the blackout is less likely to occur has high reflectivity. For this reason, when the light source unit 21 is in the first irradiation mode in which the illuminance is relatively low, there is a high possibility that an intensity of reflected light from the target will be suitable for acquisition of a clear image by the camera 6.

On the other hand, a target (a pedestrian and the like) in which the blackout is likely to occur has low reflectivity and the intensity of reflected light from the target is weak, in many cases. Therefore, the light source unit 21 is set to a second mode in which an illuminance is high so as to make the intensity of reflected light from the target be suitable for acquisition of a clear image by the camera 6, and the camera 6 is then enabled to take an image. There is a high possibility that there is no blackout in an image acquired by the camera 6 when the light source unit 21 is in the second irradiation mode.

Therefore, the blackout region in the image of FIG. 4B, which has been acquired by the camera 6 when the light source unit 21 is in the first irradiation mode, is replaced with the image of FIG. 4C, which has been acquired by the camera 6 when the light source unit 21 is in the second irradiation mode. Thereby, it is possible to acquire the intermediate image with no blackout.

In the meantime, the vehicle illumination system 20 may further execute following processing.

The image generation unit 25 specifies a region (a part B in FIG. 4C) of an excessive amount of light (halation) in the acquired intermediate image (step S06). Specifically, the image generation unit 25 detects a part, in which the luminance is a second preset threshold value or greater, in the intermediate image and specifies a second position coordinate that is a coordinate of the part. Then, the image generation unit 25 specifies information about the second position coordinate in the first image (step S07). The second threshold value is a threshold value of an amount of light greater than the first threshold value.

Then, the image generation unit 25 replaces the information of the intermediate image with the information of the first image with respect to the second position coordinate. Thereby, an output image in which a part, which has a luminance equal to or greater than the second threshold value, of the second image part in the intermediate image has been replaced and complemented with a part of the first image corresponding to the part is acquired (step S08).

In the meantime, when it is determined that there is no part having the luminance equal to or greater than the second threshold value and there is no excessive amount of light (halation) in the acquired intermediate image (step S05), the image generation unit 25 sets the acquired intermediate image as the output image, and ends the processing.

After the image complement processing, the vehicle system 2 acquires the surrounding information about a pedestrian, an oncoming vehicle, a front traveling vehicle, a mark, a road surface and the like from the obtained output image, and performs automatic driving control of the vehicle 1, based on the surrounding information.

Meanwhile, in the image complement processing, the imaging control unit 24 issues a command to the illuminance setting unit 22 to switch the irradiation mode of the light source unit 21, thereby acquiring the first image and the second image. Therefore, the capturing timing is slightly different between the first image and the second image, so that capturing points of the first image and the second image are different. For this reason, in the vehicle illumination system 20, the first image and the second image are captured in a short time in which the image complement processing is not influenced. In the meantime, before performing the image complement processing, correction processing of correcting a positional deviation between the first image and the second image may be performed.

As described above, according to the vehicle illumination system 20 of the first exemplary embodiment, the output image is generated by the first image and the second image. The first image and the second image have such a relation that a demerit of one side is complemented by a merit of the other side. A dark target in the first image, which is difficult to be recognized due to an insufficient amount of light, can be easily recognized by the part replaced with the second image. In this way, it is possible to obtain a clear image by replacing the part in the first image, which is difficult to be recognized, with the part of the second image.

Like this, according to the vehicle illumination system 20 of the first exemplary embodiment, since the output image, in which the first image and the second image have been complemented with each other by the easily-recognizable parts thereof, is acquired, it is possible to favorably acquire the information about the front of the vehicle 1, irrespective of the amount of light of the incident light.

In particular, according to the vehicle illumination system 20 of the first exemplary embodiment, the irradiation mode of the light source unit 21 is alternately switched between the first irradiation mode and the second irradiation mode, so that it is possible to securely acquire the first image and the second image and to execute the image complement processing.

Also, the light source unit 21 is configured to irradiate the front of the vehicle 1 with the light in the first irradiation mode, in which the illuminance is low, in normal times, and the light source unit 21 is controlled to change the irradiation mode to the second irradiation mode with a predetermined interval. As a result, it is difficult to irradiate the glare toward an oncoming vehicle and the like.

In this case, when the predetermined interval with which the irradiation mode of the light source unit 21 is switched is set to 20 msec or shorter, the flicker is not irradiated to the driver even though the first irradiation mode and the second irradiation mode are switched.

According to the vehicle 1 having the vehicle illumination system 20 of the first exemplary embodiment, it is possible to acquire the surrounding information about a pedestrian, an oncoming vehicle, a front traveling vehicle, a mark, a road surface and the like from the obtained output image, and to favorably perform the automatic driving control on the basis of the surrounding information.

Second Exemplary Embodiment

Subsequently, the image complement processing of a second exemplary embodiment is described.

In the second exemplary embodiment, the control flow of the image complement processing is different from the first exemplary embodiment.

Figure 6:
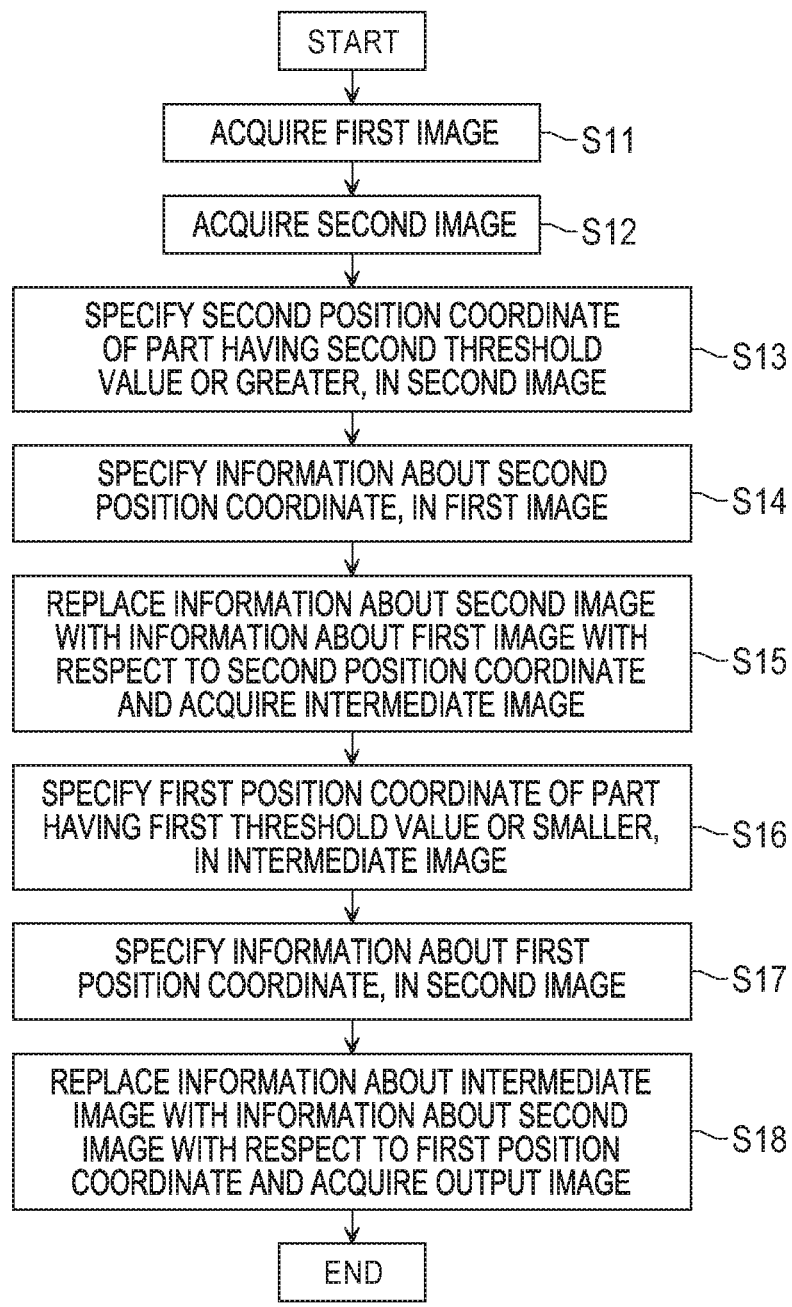
FIG. 6 is a flowchart showing image complement processing by a vehicle illumination system in accordance with a second exemplary embodiment.

FIG. 6 is a flowchart showing the image complement processing by the vehicle illumination system in accordance with the second exemplary embodiment.

When the illuminance setting unit 22 is instructed to set the light source unit 21 to the first irradiation mode, the imaging control unit 24 issues a command to the shutter control unit 23, thereby causing the camera 6 to capture the front of the vehicle 1 and to output the first image, which is data of the image, to the image generation unit 25 (step S11). Thereby, the image generation unit 25 acquires the image of FIG. 4B.

Also, when the illuminance setting unit 22 is instructed to set the light source unit 21 to the second irradiation mode, the imaging control unit 24 issues a command to the shutter control unit 23, thereby causing the camera 6 to capture the front of the vehicle 1 and to output the second image, which is data of the image, to the image generation unit 25 (step S12). Thereby, the image generation unit 25 acquires the image of FIG. 4C.

Then, the image generation unit 25 specifies a region (a part B in FIG. 4C) of an excessive amount of light (halation) in the second image transmitted from the camera 6 (step S13). Specifically, the image generation unit 25 detects a part, in which the luminance is a second threshold value or greater, in the second image and specifies a second position coordinate that is a coordinate of the part.

The image generation unit 25 specifies information about the second position coordinate in the first image, based on the first image (step S14). That is, the region of the excessive amount of light (halation) specified in the second image is specified in the first image.

Then, the image generation unit 25 replaces the information of the second image with the information of the first image with respect to the second position coordinate. Thereby, an intermediate image in which a part of the second image, which has a luminance equal to or greater than the second threshold value, has been replaced with a part of the first image corresponding to the part is acquired (step S15).

In this way, the halation region in FIG. 4C is replaced with the image of FIG. 4B, so that it is possible to acquire the intermediate image with no halation.

A target (a pedestrian and the like) in which the halation is less likely to occur has low reflectivity. For this reason, when the light source unit 21 is in the second irradiation mode in which the illuminance is relatively high, there is a high possibility that an intensity of reflected light from the target will be suitable for acquisition of a clear image by the camera 6.

On the other hand, a target (a mark and the like) in which the halation is likely to occur has high reflectivity and the intensity of reflected light from the target is excessively high, in many cases. Therefore, the light source unit 21 is set to a first mode in which an illuminance is low so as to make the intensity of reflected light from the target be suitable for acquisition of a clear image by the camera 6, and the camera 6 is then enabled to take an image. There is a high possibility that there is no halation in an image acquired by the camera 6 when the light source unit 21 is in the first irradiation mode.

Therefore, the halation region in the image of FIG. 4C, which has been acquired by the camera 6 when the light source unit 21 is in the second irradiation mode, is replaced with the image of FIG. 4B, which has been acquired by the camera 6 when the light source unit 21 is in the first irradiation mode. Thereby, it is possible to acquire the intermediate image with no halation.

Then, the vehicle illumination system 20 may further execute following processing, as required.

The image generation unit 25 specifies a region (a part A in FIG. 4B) of an insufficient amount of light (blackout) in the acquired intermediate image (step S16). Specifically, the image generation unit 25 detects a part, in which the luminance is equal to or smaller than the first threshold value, in the intermediate image and specifies a first position coordinate that is a coordinate of the part. Then, the image generation unit 25 specifies information about the first position coordinate in the second image (step S17).

Then, the image generation unit 25 replaces the information of the intermediate image with the information of the second image with respect to the first position coordinate. Thereby, an output image in which a part, which has an illuminance equal to or smaller than the first threshold value, of the first image part in the intermediate image has been replaced and complemented with a part of the second image corresponding to the part is acquired (step S18).

In the meantime, when it is determined that there is no part having the luminance equal to or smaller than the first threshold value and there is no insufficient amount of light (blackout) in the acquired intermediate image (step S15), the image generation unit 25 sets the acquired intermediate image as the output image, and ends the processing.

After the image complement processing, the vehicle system 2 acquires the surrounding information about a pedestrian, an oncoming vehicle, a front traveling vehicle, a mark, a road surface and the like from the obtained output image, and performs automatic driving control of the vehicle 1, based on the surrounding information.

Also in the case of the vehicle illumination system 20 of the second exemplary embodiment, since the output image, in which the first image and the second image have been complemented with each other by the easily-recognizable parts thereof, is acquired, it is possible to favorably acquire the information about the front of the vehicle 1, irrespective of the amount of light of the incident light.

That is, the part of the second image, which is difficult to be recognized, is replaced with the part of the first image, so that the output image, in which the first image and the second image have been complemented with each other by the easily-recognizable parts thereof, is acquired. Therefore, it is possible to securely obtain the information about the front of the vehicle 1 from the output image.

Third Exemplary Embodiment

Subsequently, the image complement processing of a third exemplary embodiment is described.

Figure 7A:
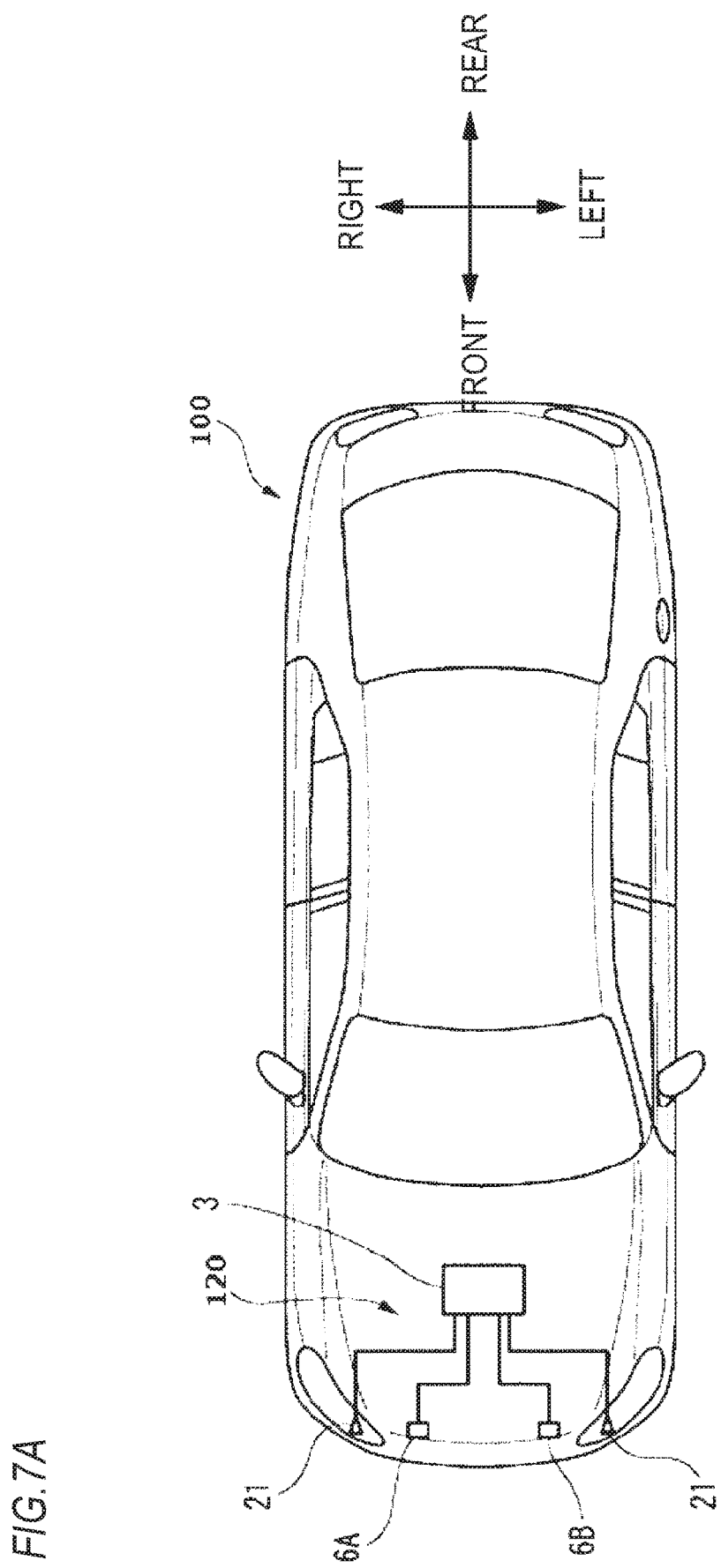
FIG. 7A is a plan view of a vehicle in accordance with a third exemplary embodiment of the present invention.
Figure 7B:
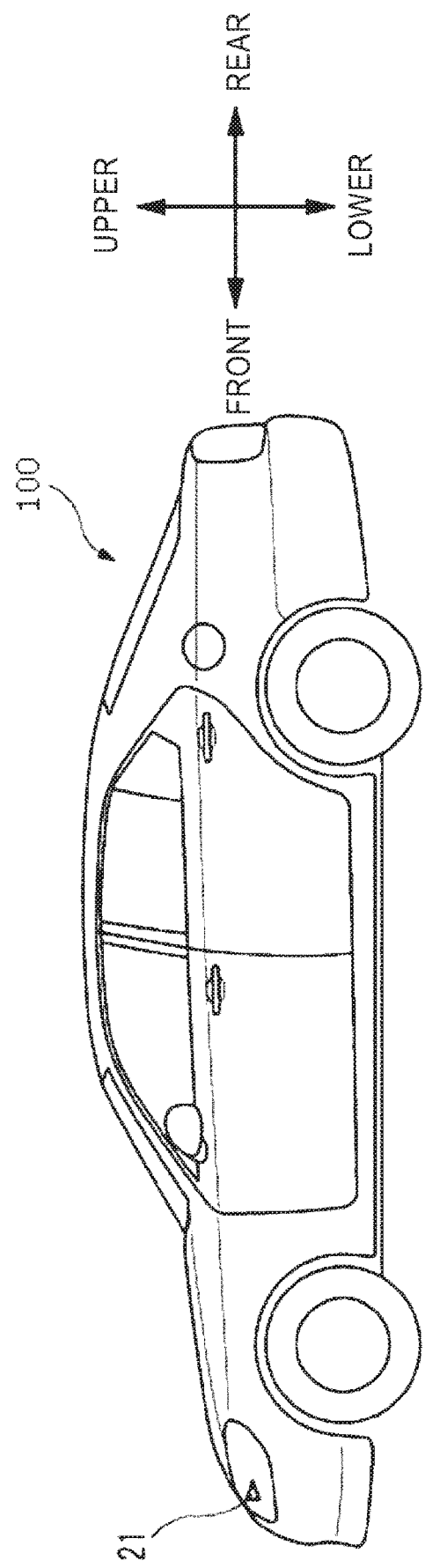
FIG. 7B is a side view of the vehicle shown in FIG. 7A.

FIGS. 7A and 7B depict a vehicle 100 on which a vehicle illumination system 120 of the third exemplary embodiment is mounted. FIG. 7A is a plan view of the vehicle 100, and FIG. 7B is a side view of the vehicle 100. The vehicle 100 is an automobile that can travel in an automatic driving mode, and includes the vehicle illumination system 120.

Figure 8:
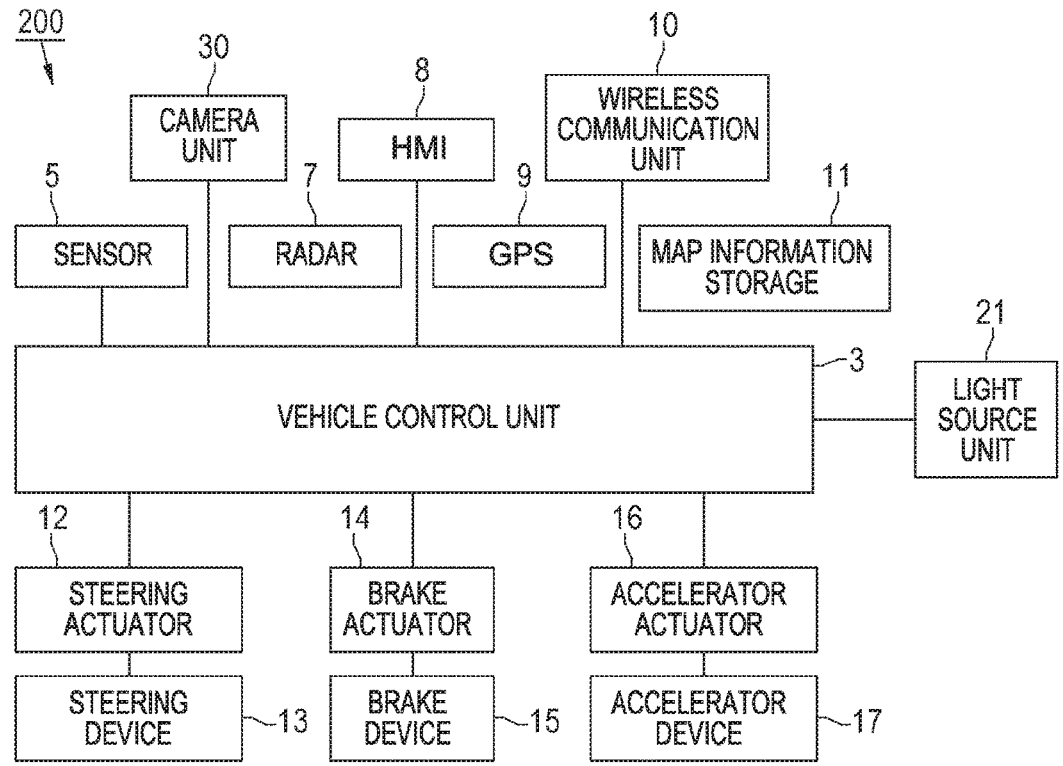
FIG. 8 is a block diagram of the vehicle system.

First, a vehicle system 200 of the vehicle 100 is described with reference to FIG. 8. FIG. 8 is a block diagram of the vehicle system 200. As shown in FIG. 8, the vehicle system 200 includes a vehicle control unit 3, a sensor 5, a camera unit 30, a radar 7, an HMI (Human Machine Interface) 8, a GPS (Global Positioning System) 9, a wireless communication unit 10, and a map information storage 11. Also, the vehicle system 200 includes a steering actuator 12, a steering device 13, a brake actuator 14, a brake device 15, an accelerator actuator 16, and an accelerator device 17.

The vehicle control unit 3 is configured by an electronic control unit (ECU). The electronic control unit is configured by a processor such as a CPU (Central Processing Unit), a ROM (Read Only Memory) in which a variety of vehicle control programs are stored, and a RAM (Random Access Memory) in which a variety of vehicle control data is temporarily stored. The processor is configured to develop a program, which is designated from the diverse vehicle control programs stored in the ROM, on the RAM, and to execute a variety of processing in cooperation with the RAM. The vehicle control unit 3 is configured to control traveling of the vehicle MO.

The sensor 5 includes an acceleration sensor, a speed sensor, a gyro sensor, and the like. The sensor 5 is configured to detect a traveling condition of the vehicle 100 and to output traveling condition information to the vehicle control unit 3. The sensor 5 may further include a seating sensor configured to detect whether a driver is sitting on a driver seat, a face direction sensor configured to detect a direction of a driver's face, an external weather sensor configured to detect an external weather condition, a passenger detection sensor configured to detect whether there is a passenger in a vehicle, and the like. Also, the sensor 5 may include an illuminance sensor configured to detect an illuminance of a surrounding environment around the vehicle 100.

The camera unit 30 is, for example, a camera including an imaging element such as a CCD (Charge-Coupled Device) and a CMOS (complementary MOS). The camera unit 30 is a camera configured to detect visible light or an infrared sensor configured to detect infrared rays. The radar 7 is a millimeter wave radar, a microwave radar or a laser radar. The camera unit 30 and the radar 7 are configured to detect a surrounding environment (other vehicle, a pedestrian, a road shape, a traffic sign, an obstacle and the like) around the vehicle 100, and to output information about the surrounding environment to the vehicle control unit 3.

The HMI 8 includes an input unit configured to receive an input operation from a driver and an output unit configured to output traveling information and the like toward the driver. The input unit includes a steering wheel, an accelerator pedal, a brake pedal, a driving mode changeover switch for switching a driving mode of the vehicle 1, and the like. The output unit is a display for displaying a variety of traveling information.

The GPS 9 is configured to acquire current position information of the vehicle 100 and to output the acquired current position information to the vehicle control unit 3. The wireless communication unit 10 is configured to receive traveling information of other vehicles around the vehicle 100 from the other vehicles and to transmit traveling information of the vehicle 100 to the other vehicles (inter-vehicle communication). Also, the wireless communication unit 10 is configured to receive infrastructure information from an infrastructure equipment such as a traffic light, a marker lamp and the like and to transmit the traveling information of the vehicle 100 to the infrastructure equipment (road-to-vehicle communication). The map information storage 11 is an external storage device such as a hard disk drive in which map information is stored, and is configured to output the map information to the vehicle control unit 3.

When the vehicle 100 travels in an automatic driving mode, the vehicle control unit 3 automatically generates at least one of a steering control signal, an accelerator control signal and a brake control signal, based on the traveling condition information, the surrounding environment information, the current position information, the map information and the like. The steering actuator 12 is configured to receive the steering control signal from the vehicle control unit 3 and to control the steering device 13 on the basis of the received steering control signal. The brake actuator 14 is configured to receive the brake control signal from the vehicle control unit 3 and to control the brake device 15 on the basis of the received brake control signal. The accelerator actuator 16 is configured to receive the accelerator control signal from the vehicle control unit 3 and to control the accelerator device 17 on the basis of the received accelerator control signal. In this way, in the automatic driving mode, the traveling of the vehicle 100 is automatically controlled by the vehicle system 200.

On the other hand, when the vehicle 100 travels in a manual driving mode, the vehicle control unit 3 generates a steering control signal, an accelerator control signal and a brake control signal in conformity with a driver's manual operation on the accelerator pedal, the brake pedal and the steering wheel. In this way, in the manual driving mode, the steering control signal, the accelerator control signal and the brake control signal are generated by the driver's manual operation, so that the traveling of the vehicle 100 is controlled by the driver.

Subsequently, the driving mode of the vehicle 100 is described. The driving mode includes an automatic driving mode and a manual driving mode. The automatic driving mode includes a full-automatic driving mode, an advanced driving support mode, and a driving support mode. In the full-automatic driving mode, the vehicle system 200 is configured to automatically perform all of the traveling controls of the steering control, the brake control and the accelerator control, and the driver is not in a state where it is possible to drive the vehicle 1. In the advanced driving support mode, the vehicle system 200 is configured to automatically perform all of the traveling controls of the steering control, the brake control and the accelerator control, and the driver does not drive the vehicle 1 although the driver is in a state where it is possible to drive the vehicle 100. In the driving support mode, the vehicle system 200 is configured to automatically perform a part of the traveling controls of the steering control, the brake control and the accelerator control, and the driver drives the vehicle 100 under the driving support of the vehicle system 200. On the other hand, in the manual driving mode, the vehicle system 200 is configured not to automatically perform the traveling controls, and the driver drives the vehicle 100 without the driving support of the vehicle system 200.

Also, the driving mode of the vehicle 100 may be switched by operating a driving mode changeover switch. In this case, the vehicle control unit 3 is configured to switch the driving mode of the vehicle 100 among the four driving modes (full-automatic driving mode, the advanced driving support mode, the driving support mode, and the manual driving mode) in correspondence to a driver's operation on the driving mode changeover switch. Also, the driving mode of the vehicle 100 may be automatically switched on the basis of information relating to a travel-allowed section where traveling of an automatic driving vehicle is allowed or a travel-prohibited section where the traveling of the automatic driving vehicle is prohibited or information relating to the external weather condition. In this case, the vehicle control unit 3 is configured to switch the driving mode of the vehicle 100, based on such information. Also, the driving mode of the vehicle 100 may be automatically switched by using a seating sensor, a face direction sensor, or the like. In this case, the vehicle control unit 3 is configured to switch the driving mode of the vehicle 100, based on an output signal from the seating sensor or the face direction sensor.

Subsequently, the vehicle illumination system 120 is described in detail. As shown in FIGS. 7A and 7B, the vehicle illumination system 120 includes light source units 21, and the camera unit 30. The light source units 21 are provided at left and right sides of a front part of the vehicle 100, and are configured to irradiate a front of the vehicle 100. The camera unit 30 includes a first camera 6A and a second camera 6B provided with an interval at the front part of the vehicle 100 in a width direction. The light source units 21, the first camera 6A and the second camera 6B are respectively connected to the vehicle control unit 3. In the meantime, the light source unit 21 and the camera unit 30 may be separately provided or the light source units 21, the first camera 6A and the second camera 6B may be provided integrally. In the third exemplary embodiment, the light source unit 21 is a light source mounted on a lamp configured to irradiate light over an entire capturing range of the camera unit 30. The light source unit 21 is mounted in a headlight for a vehicle.

Figure 9:
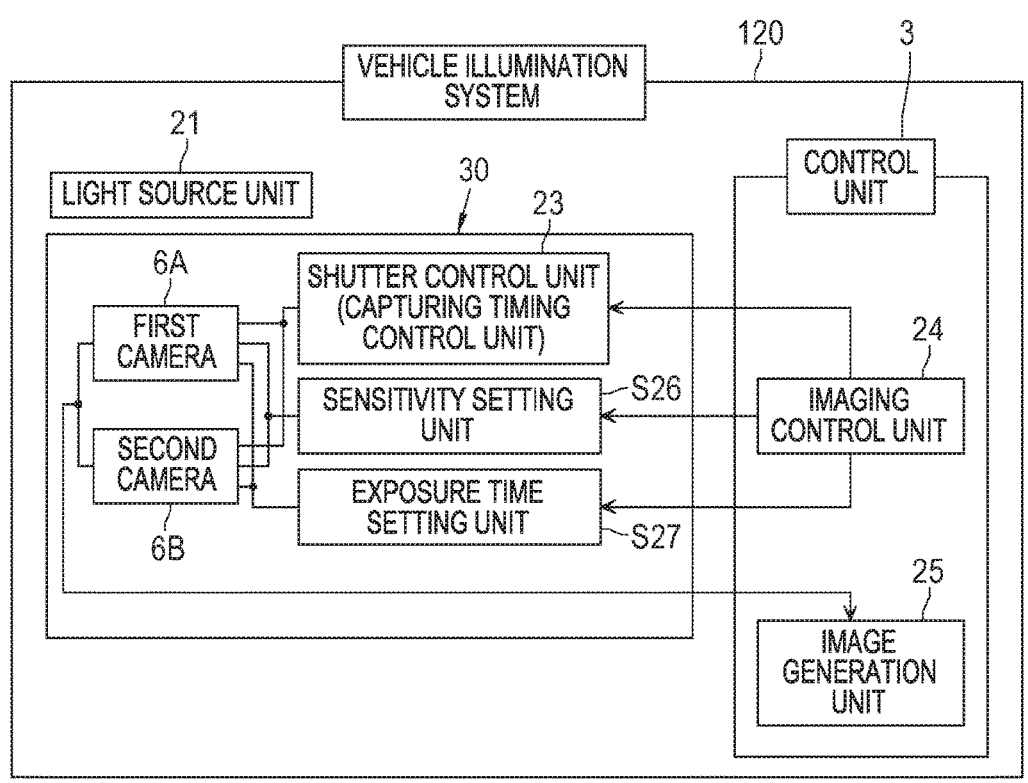
FIG. 9 is a block diagram of a vehicle illumination system in accordance with the third exemplary embodiment of the present invention.

FIG. 9 is a block diagram of the vehicle illumination system 120. As shown in FIG. 9, the vehicle illumination system 120 includes an imaging control unit 24, and an image generation unit 25. The imaging control unit 24 and the image generation unit 25 are provided in the vehicle control unit 3.

The camera unit 30 includes a shutter control unit 23, a sensitivity setting unit 26 and an exposure time setting unit 27. The first camera 6A and the second camera 6B are respectively connected to the shutter control unit 23, the sensitivity setting unit 26 and the exposure time setting unit 27. The shutter control unit 23, the sensitivity setting unit 26 and the exposure time setting unit 27 are connected to the imaging control unit 24.

The first camera 6A and the second camera 6B are connected to the image generation unit 25 of the vehicle control unit 3, and are respectively configured to transmit data of the captured image to the image generation unit 25. The image generation unit 25 is configured to acquire the data of the image from the first camera 6A and the second camera GB and to perform computation for the acquired image.

The first camera 6A and the second camera 6B are respectively configured to take an image of the front of the vehicle 100 and to acquire the information about the front of the vehicle 100. The first camera 6A and the second camera 6B are cameras of which sensitivities and exposure times can be adjusted. The shutter control unit 23 is configured to control capturing timings of the first camera 6A and the second camera 6B, based on a command from the imaging control unit 24. The sensitivity setting unit 26 is configured to set sensitivities of the first camera 6A and the second camera 6B, based on a command from the imaging control unit 24.

The exposure time setting unit 27 is configured to set the exposure times of the first camera. 6A and the second camera 6B, based on a command from the imaging control unit 24.

The camera unit 30 is configured to capture the front of the vehicle 100 in at least two imaging modes including a first imaging mode and a second imaging mode by a command from the imaging control unit 24. The second imaging mode is an imaging mode in which the capturing is performed with a higher sensitivity and for a longer exposure time than in the first imaging mode. In the meantime, the second imaging mode may be an imaging mode in which the capturing is performed with a higher sensitivity or for a longer exposure time than in the first imaging mode. In the meantime, the first imaging mode may be set as an imaging mode in which the capturing is performed with a higher sensitivity than in the second imaging mode and for the same exposure time as in the second imaging mode. Alternatively, the first imaging mode may be set as an imaging mode in which the capturing is performed with the same sensitivity as in the second imaging mode and for a longer exposure time than in the second imaging mode. In the meantime, the camera unit 30 may be configured to perform the capturing in three or more imaging modes having different sensitivities and exposure times.

The camera unit 30 is configured to set the capturing of the first camera 6A to the first imaging mode and the capturing of the second camera 6B to the second imaging mode and to enable the first camera 6A and the second camera 6B to take an image at the same time, based on a command from the imaging control unit 24. The camera unit 30 is configured to transmit data of a first image captured by the first camera 6A and data of a second image captured by the second camera 6B to the image generation unit 25.

The first camera 6A and the second camera 6B are configured to capture the front of the vehicle 100 and to acquire information about a pedestrian, an oncoming vehicle, a front traveling vehicle, a mark, a road surface and the like so as to detect the surrounding environment around the vehicle 100 during the automatic driving. The vehicle control unit 3 is configured to perform the automatic driving control of the vehicle 100, based on the surrounding information around the vehicle 100 obtained from images from the first camera 6A and the second camera 6B.

In the meantime, as compared to human eyes, a camera is difficult to recognize a bright target and a dark target at the same time. For example, when capturing a dark target, a sensitivity of a camera is set high and/or an exposure time thereof is set long. Thereby, it is possible to secure an amount of light to be received from the target, thereby acquiring a clear image with no blackout. To the contrary, when capturing a bright target, the sensitivity of the camera is set low and/or the exposure time thereof is set short. Thereby, it is possible to adjust an amount of light to be received from the target, thereby acquiring a clear image with no halation. In the meantime, the sensitivity of the camera is set by adjusting an aperture value or ISO sensitivity of the camera.

As regards the targets such as a pedestrian, an oncoming vehicle, a front traveling vehicle, a mark, a road surface and the like, which are to be acquired as the information by the camera mounted on an automatically drivable vehicle, reflected light from a mark, light to be emitted from a headlight of an oncoming vehicle, light to be emitted from a marker lamp of a front traveling vehicle, and reflected light from a road surface in the vicinity of a host vehicle have high intensities. For this reason, when the sensitivity and exposure time of the camera are set so as to conform with the intensities of the lights, the halation that an image is blurred in white due to the intense light does not occur, so that it is possible to clearly recognize the target. On the other hand, since the reflected light from a pedestrian is weak, the camera is difficult to efficiently recognize the pedestrian.

When the sensitivity of the camera is set high or the exposure time is set long so as to efficiently recognize a pedestrian, it is possible to acquire a clear image with no blackout. However, the halation is caused due to the reflected light from a mark, the light to be emitted from a headlight of an oncoming vehicle, the light to be emitted from a marker lamp of a front traveling vehicle, and the reflected light from a road surface in the vicinity of a host vehicle, so that it is difficult to efficiently recognize the corresponding targets.

FIGS. 4A to 4C show images of the front of the vehicle 100, like the vehicle 1, in which FIG. 4A is a pictorial view showing an actual image, FIG. 4B is a pictorial view showing an image of an insufficient amount of light and FIG. 4C is a pictorial view showing an image of an excessive amount of light.

In the first imaging mode of the first camera 6A, the sensitivity is lower and the exposure time is shorter, as compared to the second imaging mode of the second camera 6B. Therefore, if an actual image of the front of the vehicle 100 is the image shown in FIG. 4A, a target having high reflectivity such as a mark H can be easily recognized without causing halation due to the excessive amount of light, in an image (first image) captured by the first camera 6A in the first imaging mode, as shown in FIG. 4B. However, a blackout (a part A hatched in FIG. 4B) in which an image is darkened due to the insufficient amount of light is likely to occur in the first image.

In contrast, in the second imaging mode of the second camera 6B, the sensitivity is higher and the exposure time is longer, as compared to the first imaging mode of the first camera 6A. Therefore, a dark target can be easily recognized without causing blackout due to the insufficient amount of light, in an image (second image) captured by the second camera 6B in the second imaging mode. However, a halation (a part B in FIG. 4C) is likely to occur in the target such as a mark H in the second image due to the excessive amount of light.

Like this, the image captured by the camera unit 30 with the first camera 6A in the first irradiation mode or the image captured with the second camera 6B in the second irradiation mode may not be a clear image. Therefore, in the third exemplary embodiment, in order to improve recognition of a target in an image captured with the camera unit 30 for acquiring the surrounding information around the vehicle 100, processing of generating a single output image by the first image and the second image is executed, as follows.

FIG. 5 is a flowchart showing processing that is to be executed by the vehicle illumination system 120 in accordance with the third exemplary embodiment, like the first exemplary embodiment.

The imaging control unit 24 issues a command to the sensitivity setting unit 26 and the exposure time setting unit 27 to set a mode of the first camera 6A to the first imaging mode. The imaging control unit 24 issues a command to the shutter control unit 23 to cause the first camera 6A to capture the front of the vehicle 100 in the first imaging mode and to output a first image, which is data of the image, to the image generation unit 25 (step S01). Thereby, the image generation unit 25 acquires the image of FIG. 4B.

Also, the imaging control unit 24 issues a command to the sensitivity setting unit 26 and the exposure time setting unit 27 to set a mode of the second camera 6B to the second imaging mode. The imaging control unit 24 issues a command to the shutter control unit 23 to cause the second camera 6B to capture the front of the vehicle 100 in the second imaging mode and to output a second image, which is data of the image, to the image generation unit 25 (step S02). Thereby, the image generation unit 25 acquires the image of FIG. 4C. Here, the imaging control unit 24 issues a command to the shutter control unit 23 so as to cause the first camera 6A and the second camera 6B to capture the front of the vehicle 100 at the same time.

Then, the image generation unit 25 specifies a region (a part A in FIG. 4B) of an insufficient amount of light (blackout) in the first image transmitted from the first camera 6A (step S03). Specifically, the image generation unit 25 detects a part having a first threshold value or smaller, which is a preset threshold value of the luminance, in the first image and specifies a first position coordinate that is a coordinate of the part.

The image generation unit 25 specifies information about the first position coordinate in the second image, based on the second image transmitted from the second camera 6B (step S04). That is, the region of the insufficient amount of light (blackout) specified in the first image is specified in the second image.

Then, the image generation unit 25 replaces the information of the first image with the information of the second image with respect to the first position coordinate. Thereby, an intermediate image in which a part of the first image, which has a luminance equal to or smaller than the first threshold value, has been replaced with a part of the second image corresponding to the part is acquired (step S05).

In this way, the blackout region in FIG. 4B is replaced with the image of FIG. 4C, so that it is possible to acquire the intermediate image with no blackout.

A target (a mark and the like) in which the blackout is less likely to occur has high reflectivity. For this reason, when the first camera 6A of the camera unit 30 takes an image in the first imaging mode in which the sensitivity is low and the exposure time is short, there is a high possibility that an intensity of reflected light from the target will be suitable for acquisition of a clear image by the first camera 6A.

On the other hand, a target (a pedestrian and the like) in which the blackout is likely to occur has low reflectivity and the intensity of reflected light from the target is weak, in many cases. Therefore, the second camera 6B is caused to take an image in the second imaging mode in which the sensitivity is high and the exposure time is long so as to make the intensity of reflected light from the target be suitable for acquisition of a clear image. There is a high possibility that there is no blackout in an image acquired by the second camera 6B set to the second imaging mode. Therefore, the blackout region in the image of FIG. 4B, which has been acquired by the first camera 6A set to the first imaging mode, is replaced with the image of FIG. 4C, which has been acquired by the second camera 6B set to the second imaging mode. Thereby, it is possible to acquire the intermediate image with no blackout. In the meantime, the vehicle illumination system 120 may further execute following processing.

The image generation unit 25 specifies a region (a part B in FIG. 4C) of an excessive amount of light (halation) in the acquired intermediate image (step S06). Specifically, the image generation unit 25 detects a part, in which the luminance is a second preset threshold value or greater, in the intermediate image and specifies a second position coordinate that is a coordinate of the part. Then, the image generation unit 25 specifies information about the second position coordinate in the first image (step S07). The second threshold value is a threshold value of luminance greater than the first threshold value.

Then, the image generation unit 25 replaces the information of the intermediate image with the information of the first image with respect to the second position coordinate. Thereby, an output image in which a part, which has a luminance equal to or greater than the second threshold value, of the second image part in the intermediate image has been replaced and complemented with a part of the first image corresponding to the part is acquired (step S08).

In the meantime, when it is determined that there is no part having the luminance equal to or greater than the second threshold value and there is no excessive amount of light (halation) in the acquired intermediate image (step S05), the image generation unit 25 sets the acquired intermediate image as the output image, and ends the processing.

After the image complement processing, the vehicle system 200 acquires the surrounding information about a pedestrian, an oncoming vehicle, a front traveling vehicle, a mark, a road surface and the like from the obtained output image, and performs automatic driving control of the vehicle 100, based on the surrounding information.

As described above, according to the vehicle illumination system 120 of the third exemplary embodiment, the camera unit 30 can capture the front of the vehicle 100 in the first imaging mode and the second imaging mode in which the sensitivity is higher and/or the exposure time is longer than in the first imaging mode. The output image is generated by first image captured in the first imaging mode and the second image captured in the second imaging mode. The first image captured in the first imaging mode and the second image captured in the second capturing mode in which the sensitivity is higher and/or the exposure time is longer than in the first imaging mode have such a relation that a demerit of one side is complemented with a merit of the other side.

Therefore, the output image is generated from the first image and the second image, so that a dark target in the first image, which is difficult to be recognized due to the blackout resulting from an insufficient amount of light, can be easily recognized by the second image. Like this, according to the vehicle illumination system 120 of the third exemplary embodiment, since the output image, in which the first image and the second image have been replaced and complemented with each other by the easily-recognizable parts thereof, is acquired, it is possible to favorably acquire the information about the front of the vehicle 100, irrespective of the amount of light of the incident light.

In particular, according to the vehicle illumination system 120 of the third exemplary embodiment, the camera unit 30 is enabled to take images at the same time with the first camera 6A configured to take an image of the front of the vehicle in the first imaging mode and the second camera 6B configured to take an image of the front of the vehicle in the second imaging mode. Therefore, since it is possible to acquire the first image and the second image with no time lag, there is no positional deviation of the target between the first image and the second image, so that it is possible to easily associate the positional relation of the first image and the second image.

According to the vehicle 100 having the vehicle illumination system 120 of the third exemplary embodiment, it is possible to acquire the surrounding information about a pedestrian, an oncoming vehicle, a front traveling vehicle, a mark, a road surface and the like from the obtained output image, and to favorably perform the automatic driving control on the basis of the surrounding information.

Fourth Exemplary Embodiment

Subsequently, the image complement processing of a fourth exemplary embodiment is described.

In the fourth exemplary embodiment, the control flow of the image complement processing is different from the third exemplary embodiment.

FIG. 6 is a flowchart showing the image complement processing by the vehicle illumination system 120 in accordance with the fourth exemplary embodiment, like the second exemplary embodiment.

The imaging control unit 24 issues a command to the sensitivity setting unit 26 and the exposure time setting unit 27 to set a mode of the first camera 6A to the first imaging mode. The imaging control unit 24 issues a command to the shutter control unit 23 to cause the first camera 6A to capture the front of the vehicle 100 in the first imaging mode and to output a first image, which is data of the image, to the image generation unit 25 (step S11). Thereby, the image generation unit 25 acquires the image of FIG. 4B.

Also, the imaging control unit 24 issues a command to the sensitivity setting unit 26 and the exposure time setting unit 27 to set a mode of the second camera 6B to the second imaging mode. The imaging control unit 24 issues a command to the shutter control unit 23 to cause the second camera 6B to capture the front of the vehicle 100 in the second imaging mode and to output a second image, which is data of the image, to the image generation unit 25 (step S12). Thereby, the image generation unit 25 acquires the image of FIG. 4C.

Here, the imaging control unit 24 issues a command to the shutter control unit 23 so as to cause the first camera 6A and the second camera 6B to capture the front of the vehicle 100 at the same time.

Then, the image generation unit 25 specifies a region (a part B in FIG. 4C) of an excessive amount of light (halation) in the second image transmitted from the second camera 6B (step S13). Specifically, the image generation unit 25 detects a part, in which the luminance is a second preset threshold value or greater, in the second image and specifies a second position coordinate that is a coordinate of the part.

The image generation unit 25 specifies information about the second position coordinate in the first image, based on the first image transmitted from the first camera 6A (step S14). That is, the region of the excessive amount of light (halation) specified in the second image is specified in the first image.

Then, the image generation unit 25 replaces the information of the second image with the information of the first image with respect to the second position coordinate. Thereby, an intermediate image in which a part of the second image, which has a luminance equal to or greater than the second threshold value, has been replaced with a part of the first image corresponding to the part is acquired (step S15).

In this way, the halation region in FIG. 4C is replaced with the image of FIG. 4B, so that it is possible to acquire the intermediate image with no halation.

A target (a mark and the like) in which the halation is less likely to occur has low reflectivity. For this reason, when the second camera GB of the camera unit 30 takes an image in the second imaging mode in which the sensitivity is high and the exposure time is long, there is a high possibility that an intensity of reflected light from the target will be suitable for acquisition of a clear image by the second camera 6B.

On the other hand, a target (a pedestrian and the like) in which the halation is likely to occur has high reflectivity and the intensity of reflected light from the target is too high in the second imaging mode, in many cases. Therefore, the first camera 6A is caused to take an image in the first imaging mode in which the sensitivity is low and the exposure time is short so as to make the intensity of reflected light from the target be suitable for acquisition of a clear image. There is a high possibility that there is no halation in an image acquired by the first camera 6A, set to the first imaging mode. Therefore, when the halation region in the image of FIG. 4C, which has been acquired by the second camera 6B set to the second imaging mode, is replaced with the image of FIG. 4B, which has been acquired by the first camera 6A set to the first imaging mode, it is possible to acquire the intermediate image with no halation.

Then, the vehicle illumination system 120 may further execute following processing, as required.

The image generation unit 25 specifies a region (a part A in FIG. 4B) of an insufficient amount of light (blackout) in the acquired intermediate image (step S16). Specifically, the image generation unit 25 detects a part, in which the luminance is the first threshold value or smaller, in the intermediate image and specifies a first position coordinate that is a coordinate of the part. Then, the image generation unit 25 specifies information about the first position coordinate in the second image (step S17).

Then, the image generation unit 25 replaces the information of the intermediate image with the information of the second image with respect to the first position coordinate. Thereby, an output image in which a part, which has a luminance equal to or smaller than the first threshold value, of the first image part in the intermediate image has been replaced and complemented with a part of the second image corresponding to the part is acquired (step S18).

In the meantime, when it is determined that there is no part having the luminance equal to or smaller than the first threshold value and there is no insufficient amount of light (blackout) in the acquired intermediate image (step S15), the image generation unit 25 sets the acquired intermediate image as the output image, and ends the processing.

After the image complement processing, the vehicle system 200 acquires the surrounding information about a pedestrian, an oncoming vehicle, a front traveling vehicle, a mark, a road surface and the like from the obtained output image, and performs automatic driving control of the vehicle 100, based on the surrounding information.

According to the vehicle illumination system 120 of the second exemplary embodiment, the part of the second image, which is difficult to be recognized, is replaced with the part of the first image, so that the output image, in which the first image and the second image have been complemented with each other by the easily-recognizable parts thereof, is acquired. Therefore, it is possible to favorably and securely obtain the information about the front of the vehicle 100 from the output image.

In the exemplary embodiments, the cameras of which sensitivity and exposure time can be adjusted have been used as the first camera 6A and the second camera 6B. However, the present invention is not limited thereto. For example, with a camera unit including a first camera capable of taking an image only in the first imaging mode and a second camera capable of taking an image only in the second imaging mode, a first image may be acquired from the first camera and a second image may be acquired from the second camera.

Also, in the exemplary embodiments, the camera unit 30 includes the first camera 6A and the second camera 6B. However, the present invention is not limited thereto. For example, the imaging control unit 24 may be configured to instruct the shutter control unit 23 to control the camera unit 30 including one camera, thereby taking the first image and the second image by alternately switching the first imaging mode and the second imaging mode. In this case, the camera unit 30 is caused to alternately switch the imaging mode between the first imaging mode and the second imaging mode, so that the first image and the second image are securely acquired and the image complement processing is performed. Since it is possible to configure the camera unit 30 by a single camera, it is possible to simplify the vehicle illumination system 120.

Also, when alternately taking the first image and the second image with the camera unit 30 including a single camera, the imaging control unit 24 preferably causes the camera unit to take an image in the first imaging mode in which the exposure time is short after taking an image in the second imaging mode in which the exposure time is long. In this way, it is possible to acquire the first image and the second image with a short time lag, so that it is possible to suppress the positional deviation of the target between the first image and the second image.

Although the exemplary embodiments of the present invention have been described, the technical scope of the present invention is not construed as being limited to the exemplary embodiments. The exemplary embodiments are just examples, and a variety of changes can be made to the exemplary embodiments within the scope defined in the claims. The technical scope of the present invention should be defined on the basis of the scopes of the claims and equivalents thereof.

In the exemplary embodiments, the driving mode of the vehicle includes the full-automatic driving mode, the advanced driving support mode, the driving support mode, and the manual driving mode. However, the driving mode of the vehicle should not be limited to the four modes. The driving mode of the vehicle may include at least one of the four modes. For example, the driving mode of the vehicle may include may include only the full-automatic driving mode. In this case, the vehicle illumination device is configured to always display the information indicative of the full-automatic driving mode toward an outside of the vehicle. In the meantime, the driving mode of the vehicle may include may include only the manual driving mode. In this case, the vehicle illumination device is configured to always display the information indicative of the manual driving mode toward an outside of the vehicle.

Also, the classification and display aspects of the driving mode of the vehicle may be appropriately changed, in accordance with laws or rules relating to the automatic driving in each country. Likewise, the definitions of "the full-automatic driving mode", "the advanced driving support mode" and "the driving support mode" described in the exemplary embodiments are just examples, and can be appropriately changed, in accordance with laws or rules relating to the automatic driving in each country.

In the exemplary embodiments, the light source unit 21 is a light source mounted on a lamp capable of irradiating the light over an entire capturing range of the camera 6. However, the present invention is not limited thereto. The light source unit may be a light source mounted on a lamp capable of forming a high beam light distribution pattern. In this case, the lamp including the light source unit is configured to form a high beam light distribution pattern in a first irradiation mode in which illuminance is usual and a high beam light distribution pattern in a second irradiation mode in which illuminance is higher than in the first irradiation mode.

Alternatively, the light source unit may be a light source mounted on a lamp capable of forming a low beam light distribution pattern or a light source mounted on a lamp capable of forming a light distribution pattern, other than a high beam light distribution pattern and a low beam light distribution pattern.

Also, in the exemplary embodiments, the light source unit 21 is provided in the lamp capable of forming a high beam light distribution pattern and a low beam light distribution pattern. However, the present invention is not limited thereto. The light source unit may be mounted to the vehicle, separately from the lamp capable of forming a high beam light distribution pattern and a low beam light distribution pattern.

Also, in the exemplary embodiments, the light source unit 21 is configured to irradiate light in the first irradiation mode and the second irradiation mode. However, the present invention is not limited thereto. For example, the light source unit may include a first light source and a second light source capable of emitting lights having different intensities, the first light source may be turned on to acquire a first image while the second light source is turned off, and the second light source may be turned on to acquire a second image while the first light source is turned off.

The subject application is based on Japanese Patent Application No. 2016-243273 filed on Dec. 15, 2016 and Japanese Patent Application No. 2016-243274 filed on Dec. 15, 2016, the contents of which are appropriately incorporated herein.

The invention claimed is:

1. A vehicle illumination system comprising:
a light source unit that irradiates a front of a vehicle with light in at least two irradiation modes comprising a first irradiation mode in which light is irradiated with an illuminance that does not cause halation due to an excessive amount of light in a capturing range and a second irradiation mode in which light is irradiated with an illuminance that is higher than in the first irradiation mode and that does not cause blackout due to the insufficient amount of light in a capturing range,
a camera that captures the front of the vehicle,
an imaging control unit that sets an irradiation mode of the light source unit and a capturing timing of the camera, and
an image generation unit that performs computation for an image acquired by the camera,
wherein the imaging control unit:
enables the camera to capture the front of the vehicle and to output a first image to the image generation unit when the light source unit irradiates the front of the vehicle in the first irradiation mode, and
enables the camera to capture the front of the vehicle and to output a second image to the image generation unit when the light source unit irradiates the front of the vehicle in the second irradiation mode,
wherein the image generation unit generates a single output image by the first image and the second image,
wherein, in response to determining that a first part of the first image has a luminance equal to or smaller than a first threshold value and has blackout due to the insufficient amount of light, the image generation unit replaces the first part of the first image with a first part of the second image corresponding to the first part of the first image; and
wherein, in response to determining that a second part of the second image has a luminance equal to or greater than a second threshold value and has halation due to the excessive amount of light, the image generation unit replaces the second part of the second image with a second part of the first image corresponding to the second part of the second image.

2. The vehicle illumination system according to claim 1, wherein the imaging control unit controls the light source unit so as to alternately switch the first irradiation mode and the second irradiation mode.

3. The vehicle illumination system according to claim 1, wherein the imaging control unit is configured to control the light source unit so as to change the irradiation mode from the first irradiation mode to the second irradiation mode with a predetermined interval.

4. The vehicle illumination system according to claim 3, wherein the predetermined interval is 20 msec or shorter.

5. A vehicle illumination system comprising:
a light source unit that irradiates a front of a vehicle with light,
a camera unit that captures the front of the vehicle in at least two imaging modes including a first imaging mode and a second imaging mode in which sensitivity is higher than and/or an exposure time is longer than in the first imaging mode,
an imaging control unit that sets the imaging mode and a capturing timing of the camera unit, and
an image generation unit that performs computation for an image acquired by the camera,
wherein the imaging control unit:
enables the camera unit to capture the front of the vehicle and to output a first image to the image generation unit in the first imaging mode, and
enables the camera unit to capture the front of the vehicle and to output a second image to the image generation unit in the second imaging mode,
wherein, in response to determining that a first part of the first image has a luminance equal to or smaller than a first threshold value, the image generation unit generates a single output image from the first image and the second image by replacing the first part of the first image with a first part of the second image corresponding to the first part of the first image; and
wherein, in response to determining that a second part of the second image has a luminance equal to or smaller than a second threshold value, the image generation unit generates the single output image from the first image and the second image by replacing the second part of the second image with a second part of the first image corresponding to the second part of the second image.

6. The vehicle illumination system according to claim 5, wherein the camera unit comprises:
a first camera that takes an image of the front of the vehicle in the first imaging mode, and
a second camera that takes an image of the front of the vehicle in the second imaging mode, and
wherein the imaging control unit enables the first camera and the second camera to take an image at the same time.

7. The vehicle illumination system according to claim 5, wherein the imaging control unit enables the camera unit to take an image with alternately switching the first imaging mode and the second imaging mode.

8. The vehicle illumination system according to claim 7, wherein the imaging control unit enables the camera unit to take an image in the first imaging mode after taking an image in the second imaging mode in which the exposure time is shorter.

9. A vehicle comprising the vehicle illumination system according to claim 1.

10. A vehicle comprising the vehicle illumination system according to claim 5.

* * * * *